United States Patent
Wortmann et al.

(10) Patent No.: US 10,408,370 B2
(45) Date of Patent: Sep. 10, 2019

(54) VALVE AND COUPLING

(71) Applicant: Victaulic Company, Easton, PA (US)

(72) Inventors: Steven A. Wortmann, slatington, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 15/267,755

(22) Filed: Sep. 16, 2016

(65) Prior Publication Data

US 2017/0082227 A1 Mar. 23, 2017

Related U.S. Application Data

(60) Provisional application No. 62/340,090, filed on May 23, 2016, provisional application No. 62/220,290, filed on Sep. 18, 2015.

(51) Int. Cl.
*F16L 23/04* (2006.01)
*F16K 1/22* (2006.01)
(Continued)

(52) U.S. Cl.
CPC ............... *F16L 23/04* (2013.01); *F16K 1/22* (2013.01); *F16K 1/2263* (2013.01);
(Continued)

(58) Field of Classification Search
CPC ......... F16L 23/04; F16L 29/007; F16L 17/04; F16K 23/04; F16K 1/2263; F16K 1/2265;
(Continued)

(56) References Cited

U.S. PATENT DOCUMENTS 377,130 A 1/1888 White
1,002,835 A 9/1911 Gorton
(Continued)

FOREIGN PATENT DOCUMENTS

DE 8707484 U1 7/1987
DE 4206237 C1 5/1993
(Continued)

OTHER PUBLICATIONS

Thomas, Shane; International Search Report from counterpart International patent application No. PCT/US2016/051652, dated Feb. 6, 2017, pp. 1-4, United States Patent and Trademark Office as Searching Authority; Alexandria, Virginia USA.
(Continued)

*Primary Examiner* — Michael R Reid
(74) *Attorney, Agent, or Firm* — Ballard Spahr LLP

(57) ABSTRACT

A valve and coupling for joining pipe elements has a valve body captured in a central space defined by a plurality of coupling segments attached to one another end to end. The inner surface of the valve body defines a bore. A liner on the inner surface surrounds the bore and forms a seal with a valve closing member. Circumferentially arranged projections on the segments engage and center the valve body within the central space. The liner has lobes that extend axially in opposite directions. The lobes are compressed between the segments and the pipe elements to form a fluid tight seal when connection members are tightened to draw the segments toward the central space and into engagement with the pipe elements.

17 Claims, 25 Drawing Sheets

(51) Int. Cl.
*F16K 1/226* (2006.01)
*F16K 27/02* (2006.01)
*F16L 29/00* (2006.01)
F16K 31/60 (2006.01)
F16L 17/04 (2006.01)

(52) U.S. Cl.
CPC ........ *F16K 1/2265* (2013.01); *F16K 27/0218* (2013.01); *F16L 29/007* (2013.01); F16K 31/602 (2013.01); F16L 17/04 (2013.01)

(58) Field of Classification Search
CPC ...... F16K 1/22; F16K 27/0218; F16K 31/602; Y10T 137/6048; Y10T 137/6052
USPC ................ 251/305–307; 137/315.22, 315.23
See application file for complete search history.

(56) References Cited

U.S. PATENT DOCUMENTS

| | | |
|---|---|---|
| 3,017,204 A | 1/1962 | Smith |
| 3,024,802 A | 3/1962 | Stillwagon |
| 3,078,070 A | 2/1963 | Cooper |
| 3,078,108 A | 2/1963 | Smith |
| 3,118,465 A | 1/1964 | Domer |
| 3,134,612 A | 5/1964 | Glasgow |
| 3,260,496 A | 7/1966 | Borcherdt |
| 3,329,398 A | 7/1967 | Goldsmith |
| 3,338,551 A | 8/1967 | Black |
| 3,376,015 A | 4/1968 | Forsman et al. |
| 3,737,620 A | 6/1973 | Harvey |
| 3,874,631 A | 4/1975 | Osthues |
| 4,133,513 A | 1/1979 | Meyer |
| 4,258,901 A | 3/1981 | Zinnai et al. |
| 4,272,054 A | 6/1981 | Zinnai |
| 4,373,543 A | 2/1983 | Brown et al. |
| 4,487,216 A | 12/1984 | Barker et al. |
| 4,491,298 A | 1/1985 | Beauchamp et al. |
| 5,018,704 A | 5/1991 | McLennan |
| 5,037,141 A * | 8/1991 | Jardine ............. F16L 23/04 138/89 |
| 5,152,501 A | 10/1992 | Raymond, Jr. |
| 5,360,030 A | 11/1994 | Sisk |
| 5,482,252 A | 1/1996 | Kamezawa |
| 5,685,520 A | 11/1997 | Velan |
| 8,517,430 B2 | 8/2013 | Dole et al. |
| 8,550,502 B2 | 10/2013 | Vandal et al. |
| 2008/0173841 A1 | 7/2008 | Sisk |
| 2011/0154646 A1 | 6/2011 | Hagiya |
| 2013/0257045 A1 | 10/2013 | Mikami |
| 2016/0348800 A1 | 12/2016 | Abouelleil et al. |

FOREIGN PATENT DOCUMENTS

| | | |
|---|---|---|
| EP | 0396952 | 11/1990 |
| GB | 2033054 A | 5/1980 |
| GB | 2193296 A | 2/1988 |
| JP | H01-73582 U | 5/1989 |
| JP | H0510457 A | 1/1993 |
| JP | 08114270 | 5/1996 |
| KR | 200274908 | 5/2002 |

OTHER PUBLICATIONS

Thomas, Shane; Written Opinion from counterpart International patent application No. PCT/US2016/051652, dated Feb. 6, 2017, pp. 1-9, United States Patent and Trademark Office as Searching Authority; Alexandria, Virginia USA.

* cited by examiner

VALVE AND COUPLING

CROSS REFERENCE TO RELATED APPLICATIONS

This application is based upon and claims priority to U.S. Provisional Application No. 62/340,090, filed May 23, 2016, and U.S. Provisional Application No. 62/220,290, filed Sep. 18, 2015, both applications being incorporated by reference herein.

FIELD OF THE INVENTION

This invention relates to valves and mechanical couplings.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend inwardly from the housing and engage, for example, the outer surfaces of pipe elements of various configurations including, for example, pipe elements having circumferential grooves. Engagement between the projections and the pipe elements provides mechanical restraint to the joint and ensures that the pipe elements remain coupled even under high internal pressure and external forces. The housings define an annular channel or pocket that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Mechanical couplings according to the prior art have continuous arcuate projections on the segments that engage the outer surfaces of the pipe elements which they are joining end to end. These arcuate projections are part of the segment structure commonly referred to as the "keys" of the coupling. The keys may engage the outer surface of pipe element in various configurations including, for example, pipe elements having circumferential grooves.

The arcuate projections on prior art couplings typically have arcuate surfaces with a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the projections fit within and engage the grooves.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

Furthermore, when a valve is positioned within a pipeline two couplings are required, one on the valve intake side and one on the valve exhaust side. It would clearly be advantageous to combine the function of a valve and a coupling for improved efficiency of installation.

SUMMARY

The invention concerns a valve. In one example embodiment the valve comprises a plurality of segments attached end to end surrounding a central space. Each of the segments has first and second circumferentially arranged projections extending toward the central space. A valve body is positioned within the central space. The valve body has an outer surface facing the segments and an inner surface defining a bore therethrough. The first and second circumferentially arranged projections are engageable with the outer surface for securing the valve body within the central space. A closing member is positioned within the bore. The closing member is movable between an open and a closed configuration. A stem is attached to the closing member for moving the closing member between the open and the closed configuration. First and second connection members are positioned at opposite ends of at least two of the segments for effecting end to end attachment of the segments.

By way of example a liner overlies the inner surface of the valve body and surrounds the bore. The liner sealingly engages the closing member when in the closed configuration. In another example the liner further comprises a ring having first and second lobes positioned on opposite sides thereof. A portion of the first lobe surrounds a first portion of the outer surface of the valve body. The first projections engage the first portion of the first lobe. A portion of the second lobe surrounds a second portion of the outer surface of the valve body. The second projections engage the second portion of the second lobe.

By way of example each of the segments comprises a channel extending circumferentially around and facing the central space. Each of the channels is defined by first and second side surfaces located on opposite sides of the segments and a back surface extending between the side surfaces. The first lobe has a first lobe surface facing toward the first side surface and the second lobe has a second lobe surface facing toward the second side surface. In this example embodiment, when the lobes are seated within the channel, at least a portion of the first and second lobe surfaces come into contact respectively with the first and second side surfaces such that the lobes deform toward a center of the channel.

In a specific example the first lobe surface is oriented angularly with respect to the first side surface and the second lobe surface is oriented angularly with respect to the second side surface when the lobes are undeformed. By way of example the first and second lobe surfaces comprise convexly curved surfaces when the lobes are undeformed.

In an example embodiment each of the segments comprises a channel extending circumferentially around and facing the central space. Each of the channels is defined by first and second side surfaces located on opposite sides of the segments and a back surface extending between the side surfaces. A shroud is positioned between the valve body and the segments. The shroud comprises a ring having first and second lobes positioned on opposite sides thereof. The first lobe has a first lobe surface facing toward the first side surface and the second lobe has a second lobe surface facing toward the second side surface. The first projections engage the first lobe, and the second projections engage the second lobe. When the shroud is seated within the channels, at least a portion of the first and second lobe surfaces come into contact respectively with the first and second side surfaces such that the lobes deform toward a center of the channel.

In an example embodiment the first lobe surface is oriented angularly with respect to the first side surface and the second lobe surface is oriented angularly with respect to the second side surface when the lobes are undeformed. By way of example the first and second lobe surfaces comprise convexly curved surfaces when the lobes are undeformed. In an example embodiment a portion of the liner extends between the valve body and the first and second segments. The shroud sealingly engages the portion of the liner.

A specific example embodiment comprises only two of the segments. In an example embodiment the closing member comprises a disk rotatably mounted within the valve body. By way of example, each of the segments further comprises first and second keys positioned on opposite sides of the segments. Each of the keys extend circumferentially around and project toward the central space. In another example each of the keys comprises an arcuate surface engageable with a pipe element positioned within the central space.

In an example embodiment, a first support body is positioned adjacent to the first connection member. The first support body has a surface facing the valve body and first and second posts in spaced apart relation extending away from the central space. The first post engages a first segment, the second post engages a second segment. A second support body is positioned adjacent to the second connection member. The second support body has a surface facing the valve body and first and second posts in spaced apart relation extending away from the central space. The first post of the second support body engages the first segment, the second post of the second support body engages the second segment. The surfaces of the first and second support bodies engage the liner, the posts engage the segments, whereby the first and second support bodies cooperate with the liner to support the first and second segments in spaced apart relation in a pre-assembled configuration.

By way of example the first and second support bodies comprise a plurality of teeth projecting toward the central space. The teeth are arranged on opposite sides of the valve body for engaging pipe elements positioned within the central space when the connection members are adjustably tightened to draw the segments toward one another. An example embodiment further comprises first and second springs positioned adjacent to opposite ends of the first support body. The first spring is positioned between the valve body and the first segment, the second spring is positioned between the valve body and the second segment. Third and fourth springs are positioned adjacent to opposite ends of the second support body. The third spring is positioned between the valve body and the first segment, the fourth spring is positioned between the valve body and the second segment. Further by way of example the first and second springs are attached to the first support body, and the third and fourth springs are attached to the second support body.

Another example valve further comprises a circumferential ridge extending around the valve body. The springs act between the circumferential ridge and the first and second segments. By way of example each of the springs has a "W" cross sectional shape comprising a vertex positioned between first and second legs on opposite sides of the vertex. For each of the springs the vertex receives the circumferential ridge. The legs of the first and third springs engage the first segment, and the legs of the second and fourth springs engage the second segment.

In another example embodiment a first support body is positioned adjacent to the first connection member. The first support body has a surface facing the valve body and a boss extending away from the central space. The boss engages a first and a second segment. A second support body is positioned adjacent to the second connection member. The second support body has a surface facing the valve body and a second boss extending away from the central space. The second boss engages the first and second segments. The surfaces of the first and second support bodies engage the liner; the bosses engage the segments, whereby the first and second support bodies cooperate with the liner to support the first and second segments in spaced apart relation in a pre-assembled configuration.

By way of example the first and second support bodies comprise a plurality of teeth projecting toward the central space. The teeth are arranged on opposite sides of the valve body for engaging pipe elements positioned within the central space when the connection members are adjustably tightened to draw the segments toward one another.

An example embodiment further comprises first and second springs positioned adjacent to opposite ends of the first support body. The first spring is positioned between the valve body and the first segment, the second spring is positioned between the valve body and the second segment. Third and fourth springs are positioned adjacent to opposite ends of the second support body. The third spring is positioned between the valve body and the first segment, the fourth spring is positioned between the valve body and the second segment. By way of example the first and second springs are attached to the first support body, and the third and fourth springs are attached to the second support body.

In another example valve a circumferential ridge extends around the valve body. The springs act between the circumferential ridge and the first and second segments. By way of example each of the springs has a "W" cross sectional shape comprising a vertex positioned between first and second legs on opposite sides of the vertex. For each of the springs the vertex receives the circumferential ridge, the legs of the first and third springs engage the first segment, and the legs of the second and fourth springs engage the second segment.

In an example embodiment a first fastener extends between the boss of the first support body and the valve body. A second fastener extends between the boss of the second support body and the valve body. The fasteners attach the first and second support bodies to the valve body in this example. By way of example a first spring acts between the valve body and the boss of the first support body. A second spring acts between the valve body and the boss of the second support body. The first and second springs respectively bias the first and second support bodies away from the valve body. In a specific example embodiment the projections are circumferentially continuous. In another example embodiment the projections are circumferentially intermittent.

The invention also encompasses an example valve comprising a plurality of segments attached end to end surrounding a central space. A valve body is positioned within the central space. The valve body has an outer surface facing the segments and an inner surface defining a bore therethrough. A closing member is positioned within the bore. The closing member is movable between an open and a closed configuration. A liner overlies the inner surface of the valve body and surrounds the bore. The liner sealingly engages the closing member when in the closed configuration. A stem is attached to the closing member for moving the closing member between the open and the closed configuration. First and second connection members are positioned at opposite ends of at least two of the segments for effecting end to end attachment of the segments.

By way of example, each of the segments comprises first and second circumferentially arranged projections extending toward the central space. The first and second circumferentially arranged projections are engageable with the outer surface of the valve body for securing the valve body within the central space. In an example embodiment the liner further comprises a ring having first and second lobes positioned on opposite sides thereof. A portion of the first lobe surrounds a first portion of the outer surface of the valve body. The first projections engage the first portion of the first lobe. A portion of the second lobe surrounds a second portion of the outer surface of the valve body. The second projections engage the second portion of the second lobe.

In an example embodiment, each of the segments comprises a channel extending circumferentially around and facing the central space. Each of the channels is defined by first and second side surfaces located on opposite sides of the segments and a back surface extending between the side surfaces. The first lobe has a first lobe surface facing toward the first side surface and the second lobe having a second lobe surface facing toward the second side surface. When the lobes are seated within the channel, at least a portion of the first and second lobe surfaces come into contact respectively with the first and second side surfaces such that the lobes deform toward a center of the channel.

In an example embodiment the first lobe surface is oriented angularly with respect to the first side surface and the second lobe surface is oriented angularly with respect to the second side surface when the lobes are undeformed. In a specific example embodiment the first and second lobe surfaces comprise convexly curved surfaces when the lobes are undeformed.

Further by way of example each of the segments comprises a channel extending circumferentially around and facing the central space. Each of the channels is defined by first and second side surfaces located on opposite sides of the segments and a back surface extending between the side surfaces. A shroud is positioned between the valve body and the segments. The shroud comprises a ring having first and second lobes positioned on opposite sides thereof. The first lobe has a first lobe surface facing toward the first side surface and the second lobe has a second lobe surface facing toward the second side surface. The first projections engage the first lobe, and the second projections engage the second lobe. When the shroud is seated within the channels, at least a portion of the first and second lobe surfaces come into contact respectively with the first and second side surfaces such that the lobes deform toward a center of the channel.

In a specific example embodiment the first lobe surface is oriented angularly with respect to the first side surface and the second lobe surface is oriented angularly with respect to the second side surface when the lobes are undeformed. By way of further example the first and second lobe surfaces comprise convexly curved surfaces when the lobes are undeformed. In an example embodiment a portion of the liner extends between the valve body and the first and second segments. The shroud sealingly engages the portion of the liner. A particular example embodiment comprises only two of the segments. Further by way of example, the closing member comprises a disk rotatably mounted within the valve body.

In an example embodiment, each of the segments comprises first and second keys positioned on opposite sides of the segments. Each of the keys extends circumferentially around and projects toward the central space. By way of example each of the keys comprises an arcuate surface engageable with a pipe element positioned within the central space.

An example embodiment further comprises a first support body positioned adjacent to the first connection member. The first support body has a surface facing the valve body and first and second posts in spaced apart relation extending away from the central space. The first post engages a first segment, the second post engages a second segment. A second support body is positioned adjacent to the second connection member. The second support body has a surface facing the valve body and first and second posts in spaced apart relation extending away from the central space. The first post of the second support body engages the first segment, the second post of the second support body engages the second segment. The first and second support bodies cooperate with the liner to support the first and second segments in spaced apart relation in a pre-assembled configuration.

In an example embodiment the first and second support bodies comprise a plurality of teeth projecting toward the central space. The teeth are arranged on opposite sides of the valve body for engaging pipe elements positioned within the central space when the connection members are adjustably tightened to draw the segments toward one another. By way of example the valve further comprises first and second springs positioned adjacent to opposite ends of the first support body. The first spring is positioned between the valve body and the first segment. The second spring is positioned between the valve body and the second segment. Third and fourth springs are positioned adjacent to opposite ends of the second support body. The third spring is positioned between the valve body and the first segment, the fourth spring is positioned between the valve body and the second segment. In an example the first and second springs are attached to the first support body and the third and fourth springs are attached to the second support body.

An example embodiment further comprises a circumferential ridge extending around the valve body. The springs act between the circumferential ridge and the first and second segments. In an example embodiment, each of the springs has a "W" cross sectional shape comprising a vertex positioned between first and second legs on opposite sides of the vertex. For each of the springs the vertex receives the circumferential ridge. The legs of the first and third springs engage the first segment, and the legs of the second and fourth springs engage the second segment.

An example valve embodiment further comprises a first support body positioned adjacent to the first connection member. The first support body has a surface facing the valve body and a boss extending away from the central space. The boss engages a first and a second segment. A second support body is positioned adjacent to the second connection member. The second support body has a surface facing the valve body and a second boss extending away from the central space. The second boss engages the first and second segments. The first and second bodies cooperate with the liner to support the first and second segments in spaced apart relation in a pre-assembled configuration.

In an example embodiment the first and second support bodies comprise a plurality of teeth projecting toward the central space. The teeth are arranged on opposite sides of the valve body for engaging pipe elements positioned within the central space when the connection members are adjustably tightened to draw the segments toward one another.

An example embodiment further comprises first and second springs positioned adjacent to opposite ends of the first support body. The first spring is positioned between the valve body and the first segment, the second spring is positioned between the valve body and the second segment. Third and fourth springs are positioned adjacent to opposite ends of the second support body. The third spring is positioned between the valve body and the first segment, the fourth spring is positioned between the valve body and the second segment. By way of example the first and second springs are attached to the first support body and the third and fourth springs are attached to the second support body.

An example valve further comprises a circumferential ridge extending around the valve body. The springs act between the circumferential ridge and the first and second segments. Further by way of example, each of the springs has a "W" cross sectional shape comprising a vertex positioned between first and second legs on opposite sides of the vertex. For each of the springs the vertex receiving the circumferential ridge, the legs of the first and third springs engaging the first segment, and the legs of the second and fourth springs engaging the second segment. In an example embodiment a first fastener extends between the boss of the first support body and the valve body and a second fastener extending between the boss of the second support body and the valve body. The fasteners attach the first and second bodies to the valve body. An example embodiment further comprises a first spring acting between the valve body and the boss of the first support body. A second spring acts between the valve body and the boss of the second support body. The first and second springs respectively bias the first and second support bodies away from the valve body. In an example embodiment the projections are circumferentially continuous. In another example embodiment the projections are circumferentially intermittent.

The invention further encompasses a seal for a valve having a valve closing member. In one example embodiment the seal comprises a ring having an inner surface surrounding a bore. The inner surface is sealingly engageable with the valve closing member. First and second lobes are positioned on opposite sides of the ring. The lobes extend circumferentially around the ring and project in opposite directions from one another along an axis coaxial with the bore. By way of example each the lobe comprises a band having a first edge attached to the ring and a second oppositely disposed edge comprising a sealing surface facing the axis. In an example embodiment each band has an arcuate cross sectional shape. By way of further example each band is angularly oriented with respect to the axis.

Another example seal comprises a first strip having a first edge attached to the ring adjacent to the first band. A second strip has a second edge attached to the ring adjacent to the second band. The first and second strips extend circumferentially around the ring and project toward one another. In an example embodiment the first and second strips project parallel to the axis.

The invention further encompasses a method of joining pipe elements using a valve comprising a plurality of segments attached end to end surrounding a central space and a valve body positioned within the central space. In one example embodiment the method comprises:

inserting the pipe elements into the central space from opposite sides of the valve;

drawing the segments toward the central space so as to engage the segments with the pipe elements;

while drawing the segments toward the central space, engaging projections on the segments with the valve body.

By way of further example, engaging the projections with the valve body comprises circumferentially contacting the valve body with first and second circumferentially arranged projections extending from the segments toward the central space. An example embodiment further comprises centering the valve body within the central space by engaging projections on the segments with grooves in the valve body. In another example, engaging the projections on the segments with grooves in the valve body comprises circumferentially contacting circumferential grooves in the valve body with first and second circumferentially arranged projections extending from the segments toward the central space.

BRIEF DESCRIPTION OF THE DRAWINGS

FIG. 2A is an isometric view of a component of a combination valve and coupling;

DETAILED DESCRIPTION

Figure 1:
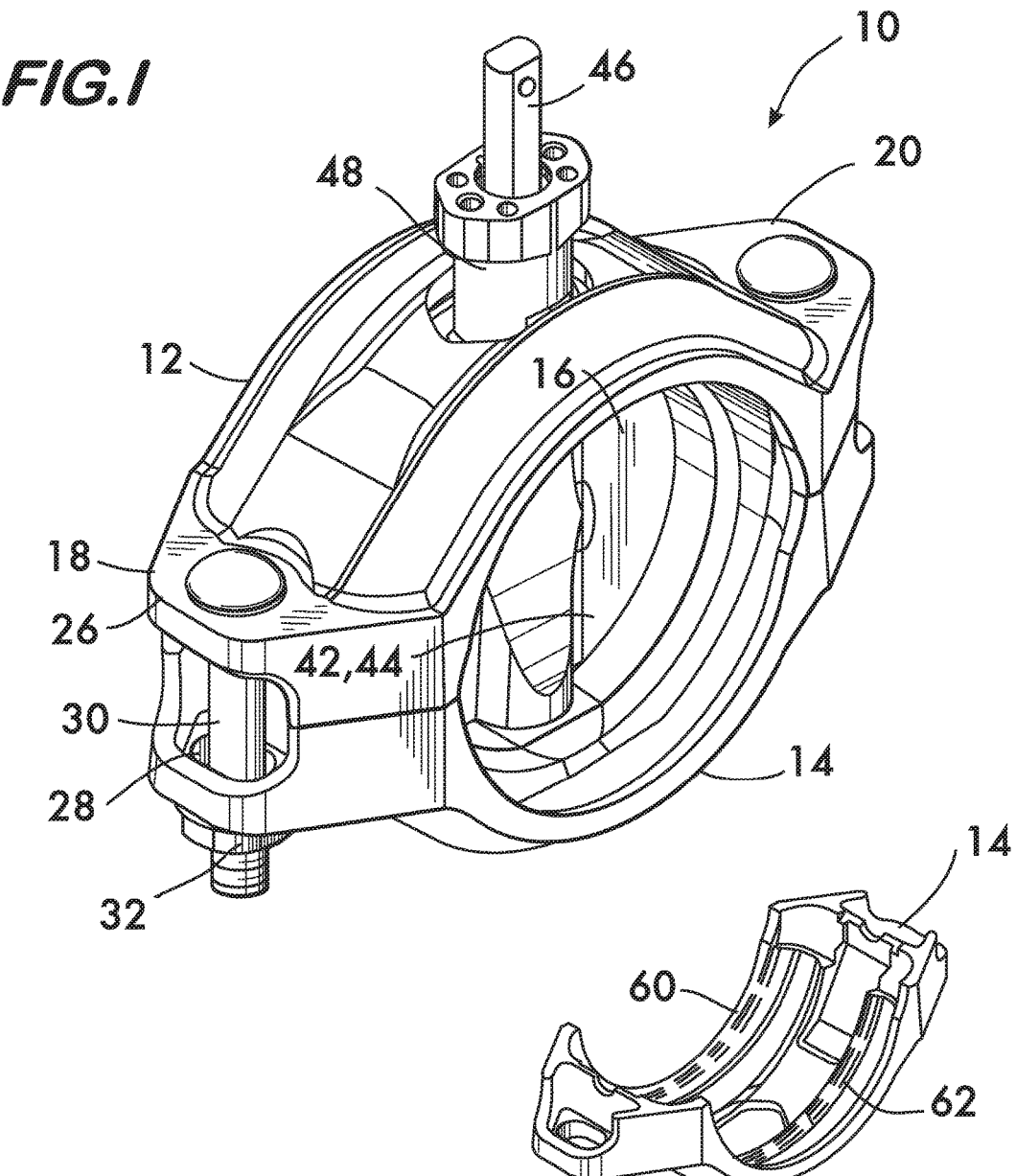
FIG. 1 is an isometric view of an example embodiment of a combination valve and coupling according to the invention.
Figure 2:
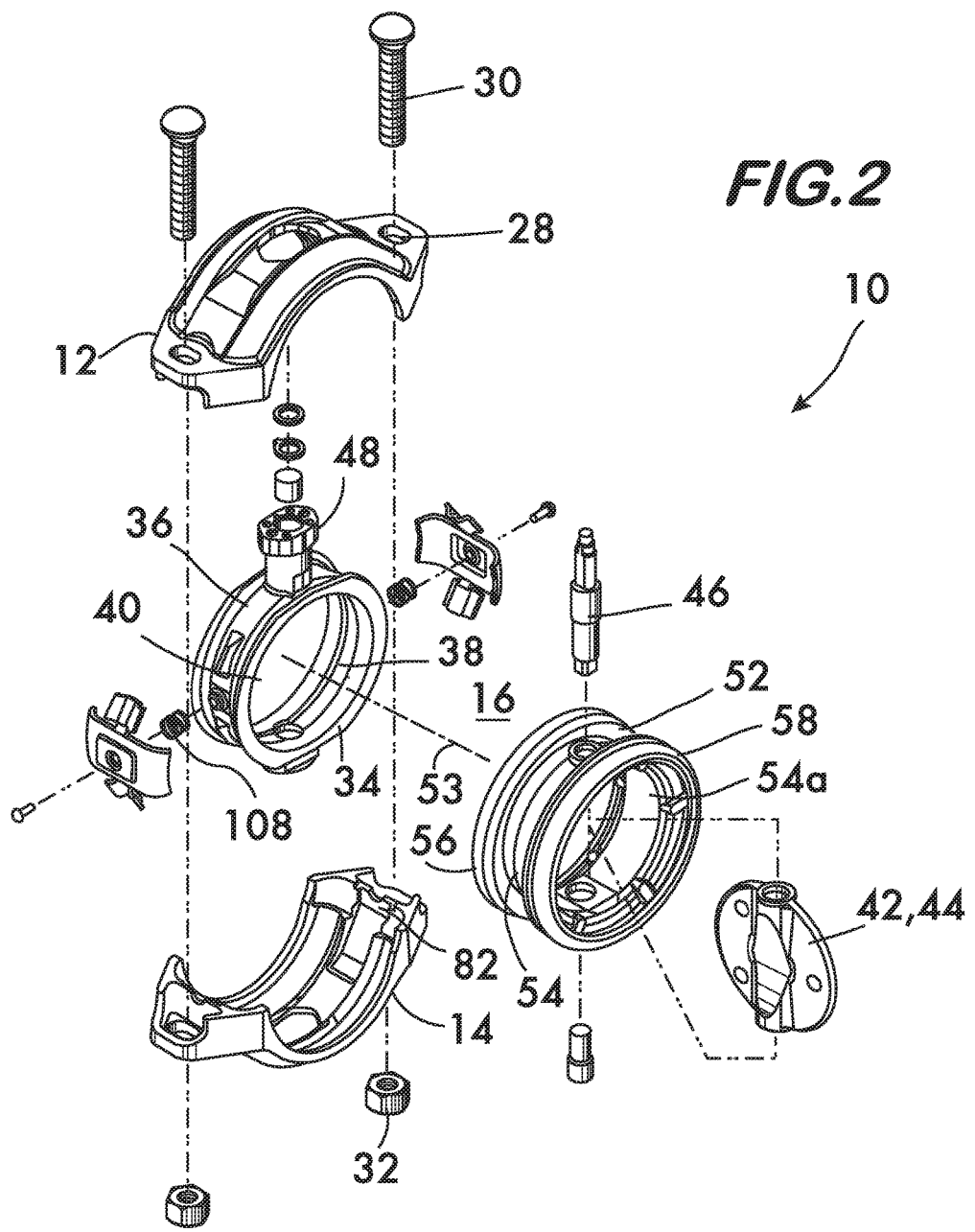
FIG. 2 is an isometric exploded view of the combination valve and coupling shown in FIG. 1.

FIGS. 1 and 2 show an example embodiment of a combination valve and coupling according to the invention, hereafter referred to as a "valve". Valve 10 comprises a plurality of segments, in this example first and second segments 12 and 14 attached end to end surrounding a central space 16. First and second connection members 18 and 20 are positioned at opposite ends of at least two segments (in this example each segment 12 and 14) for effecting end to end attachment of the segments. Connection members 18 and 20 are adjustably tightenable for drawing the segments 12 and 14 toward one another and into engagement with pipe elements 22 and 24 (see FIG. 31) to join the pipe elements end to end. In this example the connection members comprise lugs 26 having holes 28 that receive fasteners such as bolt 30 and nut 32 providing for adjustable tightening.

As shown in FIG. 2, valve 10 further comprises a valve body 34 positioned within the central space 16 and captured between segments 12 and 14. Valve body 34 has an outer surface 36 that faces the segments 12 and 14, and an inner surface 38 defining a bore 40 through the valve body. A valve closing member 42 is positioned within bore 40 and is movable between an open and a closed configuration. In this example closing member 42 comprises a disk 44 rotatably mounted within the valve body 34. Disk 44 is mounted on a stem 46 for rotation between the open and closed configurations. A portion of the stem 46 extends through a neck 48 on the valve body 34. Neck 48 extends through the first segment 12 to permit a handle 50 (see FIG. 32) or other form of actuator to be attached to stem 46 to effect opening and closing of the valve 10.

Figure 3:
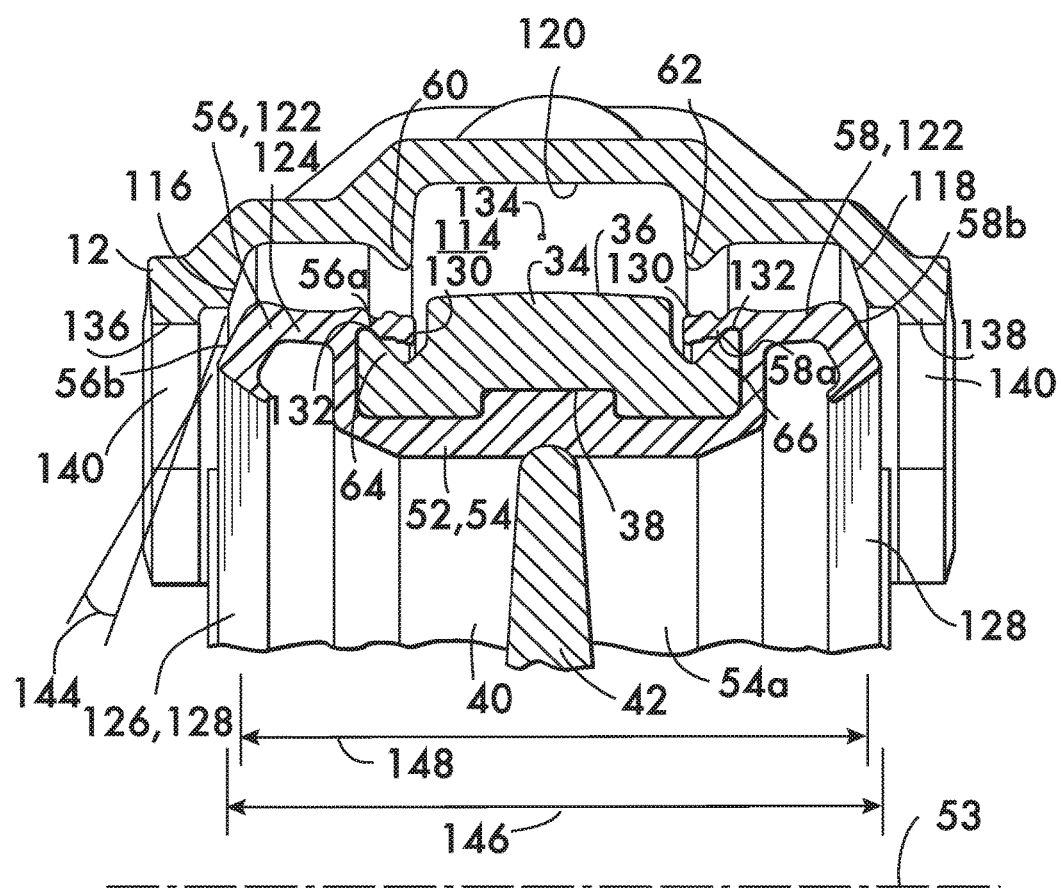
FIGS. 3, 3A and 4 are partial sectional views of the combination valve and coupling shown in FIG. 1.
Figure 4:
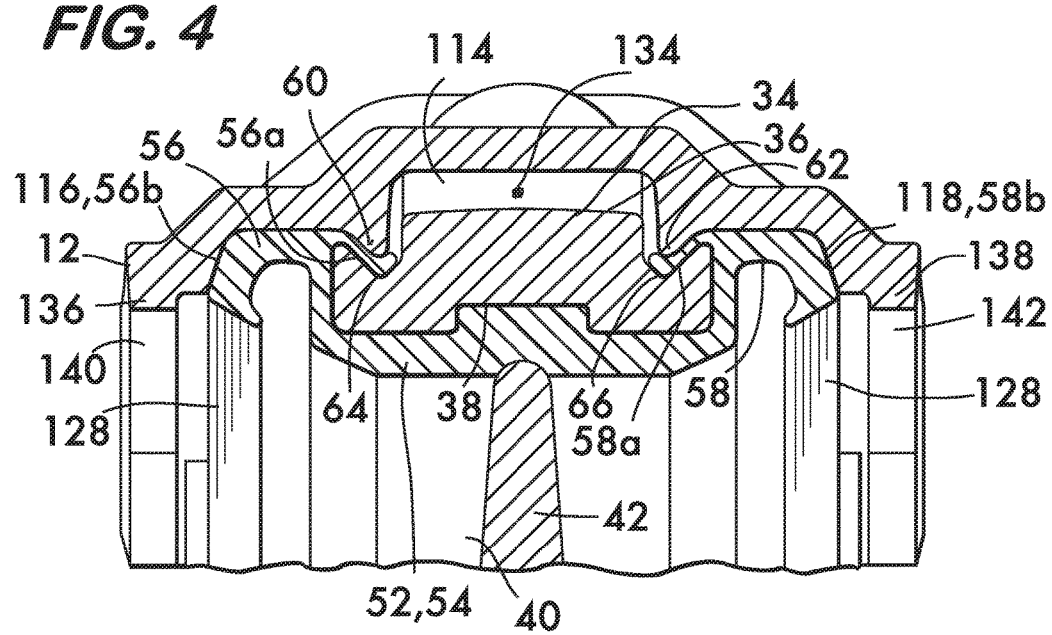
Figure 5:
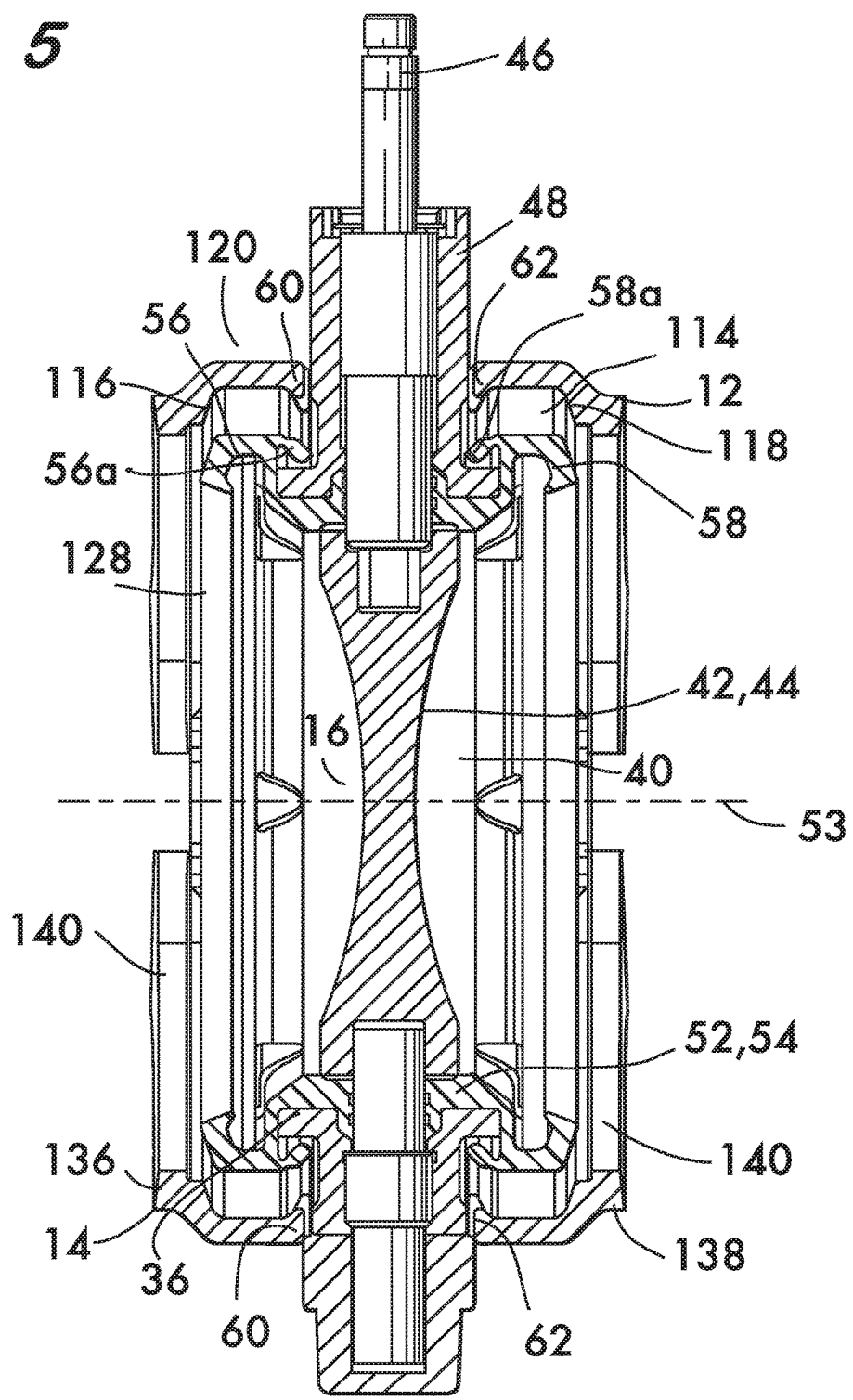
FIGS. 5 and 6 are longitudinal sectional views of the combination valve and coupling shown in FIG. 1.

As shown in FIGS. 2 and 3, a seal, in this example, liner 52, overlies the inner surface 38 of the valve body 34. Liner 52 is made of a flexible, resilient material such as an elastomer or urethane. In this example embodiment the liner 52 comprises a ring 54 having an inner surface 54a which surrounds bore 40 and sealingly engages the valve closing member 42 when it is in the closed configuration (shown in FIG. 3). First and second lobes 56 and 58 are positioned on opposite sides of the ring 54. Lobes 56 and 58 extend circumferentially around ring 54 and project in opposite directions from one another along an axis 53 coaxial with bore 40. As shown in FIG. 3, a portion of each lobe 56a and 58a surrounds a portion of the outer surface 36 of the valve body 34. As shown in FIGS. 3 and 5, each segment 12 and 14 has first and second circumferentially arranged projections 60 and 62 positioned on opposite sides of the segments 12 and 14. Projections 60 and 62 engage the valve body 34 and secure it within the central space 16. To this end, projections 60 and 62 extend toward the central space 16 and may be circumferentially continuous, as shown in FIG. 2, or intermittent, taking the form of teeth as shown in FIG. 2A. As shown by a comparison of FIGS. 3 and 4, when the connection members 18 and 20 (see FIG. 1) are adjustably tightened to draw the segments 12 and 14 toward one another, the first projections 60 engage the outer surface 36 of valve body 34. It is advantageous to form circumferential grooves 64 and 66 to respectively receive projections 60 and 62. The geometrical relations of the projections 60 and 62 and the grooves 64 and 66 are such that valve body 34 becomes centered and secured within the central space 16 defined by the segments 12 and 14 by the mechanical engagement between the projections and the grooves.

Figure 6:
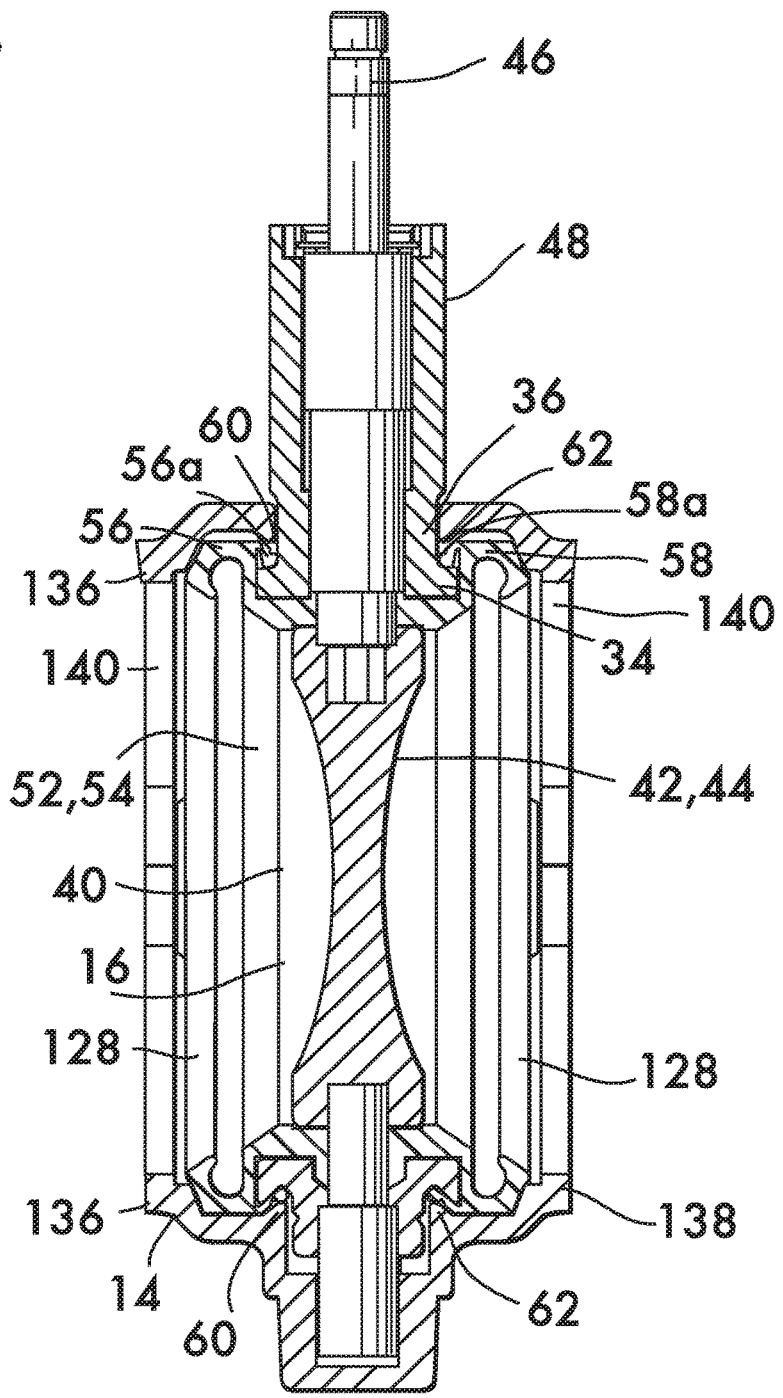

Portion 56a of the first lobe 56, when present, also surrounds the outer surface 36 of valve body 34 and provides a seal between the projections 60 and the valve body. The second projections 62 also engage the outer surface 36 of valve body 34. Portion 58a of the second lobe 58, when present, surrounds the outer surface 36 of the valve body 34 and provides a seal between the projections 62 and the valve body. FIGS. 3 and 5 show the segments 12 and 14 in spaced apart relation, as they would appear before pipe elements are inserted into the central space 16, and FIGS. 4 and 6 show the segments 12 and 14 as they would appear once the connection members 18 and 20 are tightened to engage the segments with the pipe elements and connect them end to end (pipe elements not shown for clarity, see FIG. 32). As shown in FIGS. 4 and 6, the portions 56a, 58a of lobes 56 and 58 are compressed between the circumferential projections 60 and 62 and the outer surface 36 of the valve body 34 when the segments 12 and 14 are drawn together to form a joint. The engagement between circumferential projections 60 and 62 and lobe portions 56a and 58a serves to prevent dislocation of the liner 52 relative to the valve body 34 due to forces acting on liner 52 by valve closing member 42 when the valve is operated. The engagement between circumferential projections 60 and 62 and lobe portions 56a and 58a, which compresses and deforms lobes 56 and 58 against outer surface 36 of valve body 34 also serves to locate and secure valve body 34 relative to segments 12 and 14 as explained above.

Figure 7:
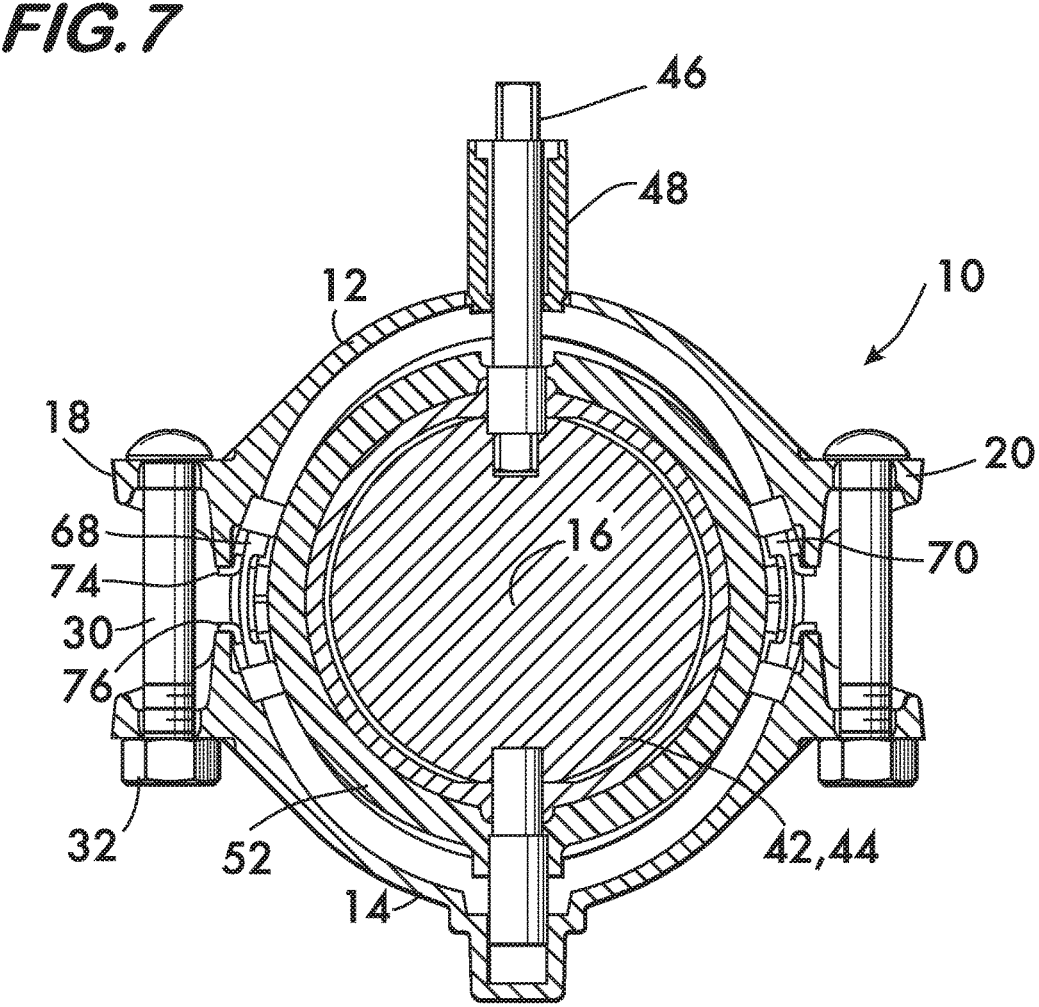
FIG. 7 is a cross sectional view of the combination valve and coupling shown in FIG. 1.
Figure 8:
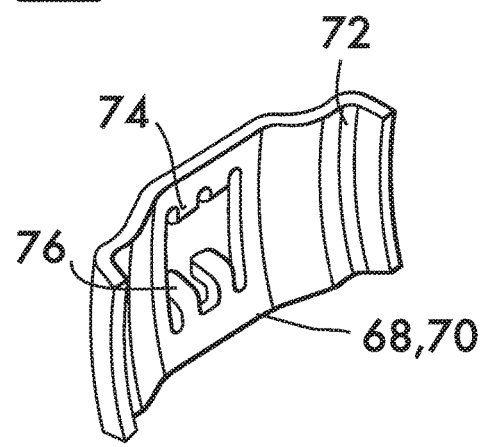
FIG. 8 is an isometric view of a component of the combination valve and coupling shown in FIG. 1.
Figure 9:
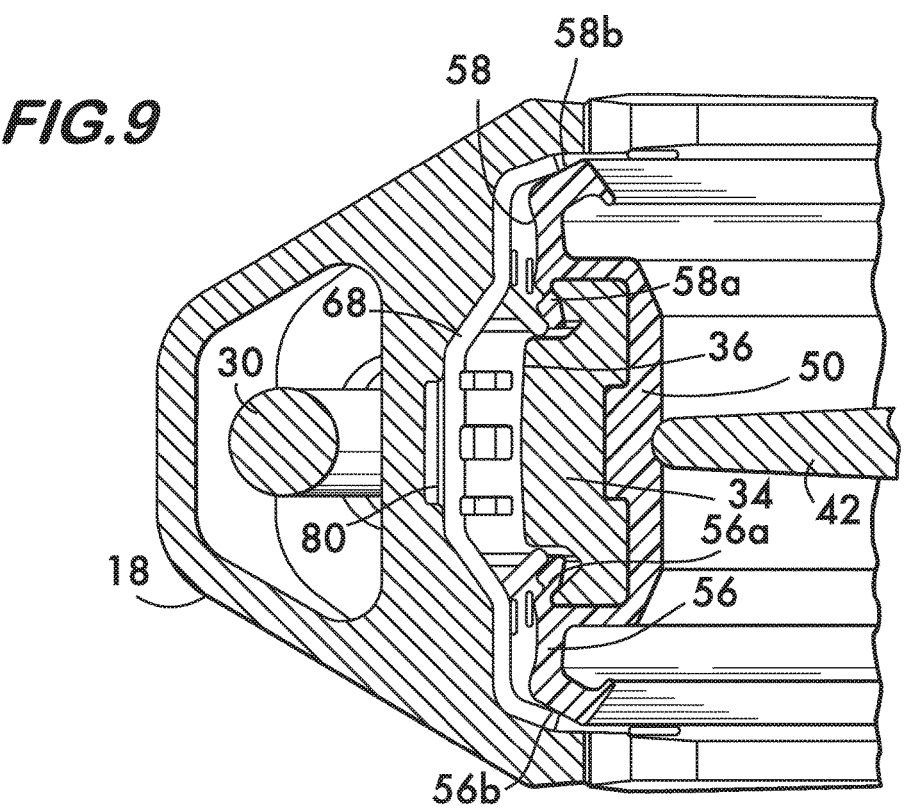
FIGS. 9 and 10 are partial sectional views of the combination valve and coupling shown in FIG. 1.

As shown in FIG. 7, it is advantageous that the segments 12 and 14 be provided in a pre-assembled state, i.e., attached to one another by fasteners 30, 32 but held in spaced apart relation, for example, at a distance sufficient to permit insertion of pipe elements into the central space 16. The pre-assembled state of the valve 10 allows a joint to be formed without first disassembling the valve and then reassembling it, thereby realizing significant time savings. To this end, first and second support bodies 68 and 70 are positioned adjacent to the first and second connection members 18 and 20. In the example shown in FIGS. 7, 8 and 9, the support bodies 68 and 70 each have a surface 72 that faces valve body 34 and engages the liner 52. The support bodies 68 and 70 also have at least first and second posts 74 and 76. Posts 74 and 76 extend away from the central space 16 and are in spaced apart relation from one another. In the pre-assembled state the segments 12 and 14 are supported in spaced relation on the posts 74 and 76 and the liner 52. The support bodies 68 and 70 thus cooperate with the liner to support the segments 12 and 14 in spaced relation. The spacing between posts 74 and 76 determines the spacing between the segments 12 and 14 when in the pre-assembled state and the spacing is sized to permit insertion of the pipe elements into the central space 16. In the example embodiment shown, there are two sets of posts 74 and 76. Support bodies 68 and 70 are, in this example, stamped from metal sheet.

Figure 10:
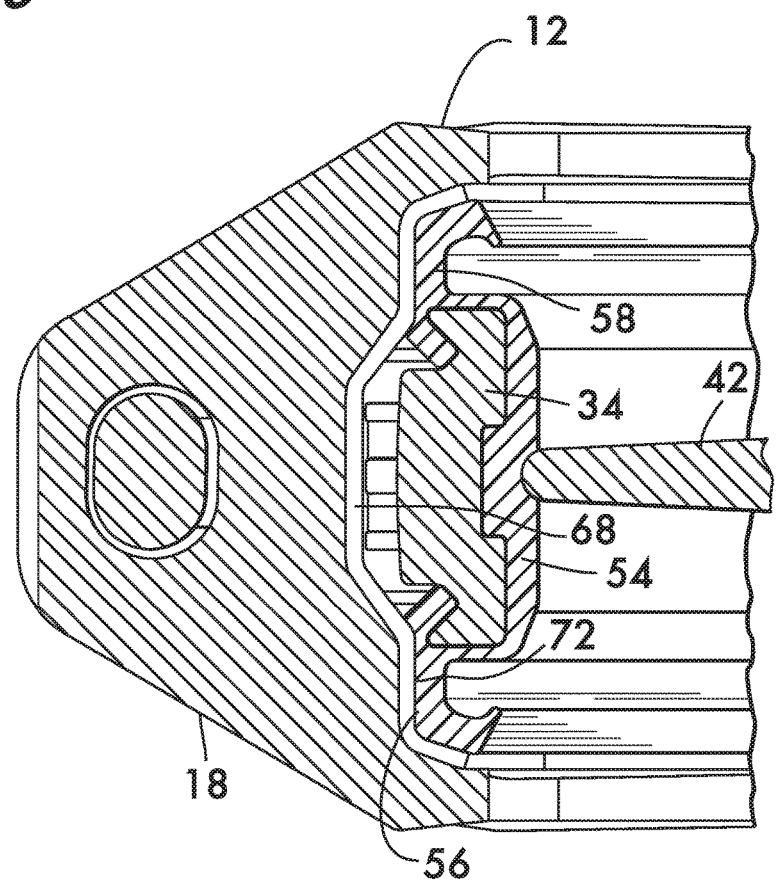
Figure 11:
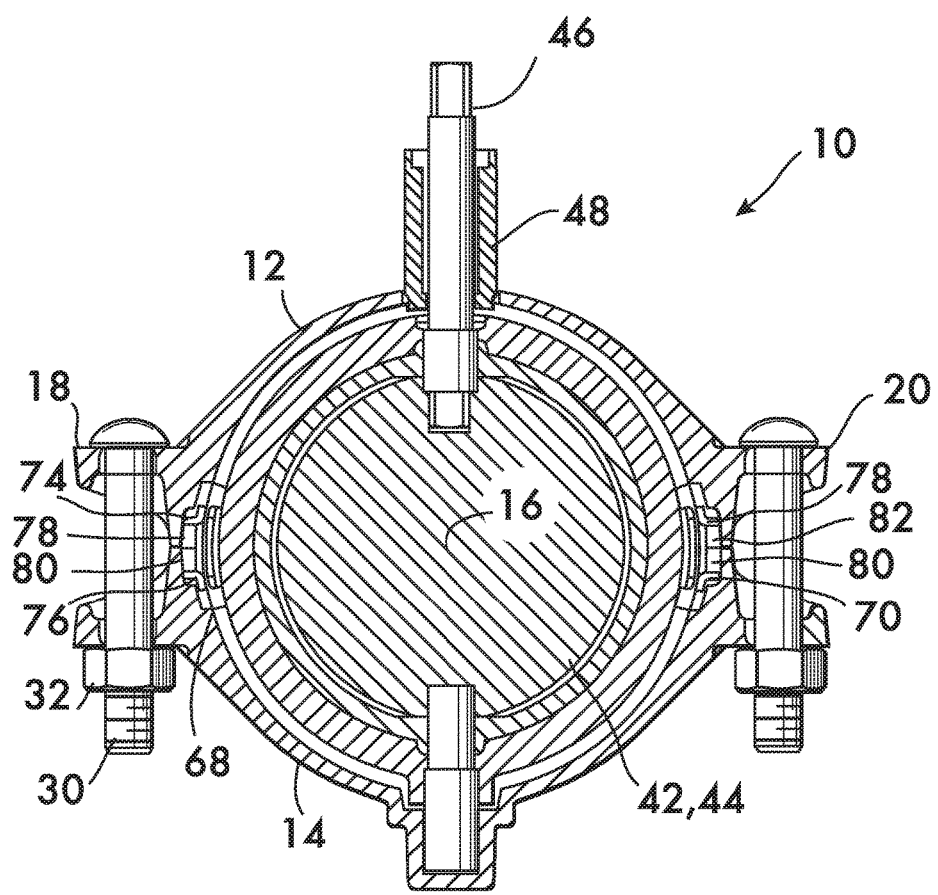
FIG. 11 is a cross sectional view of the combination valve and coupling shown in FIG. 1.
Figure 12:
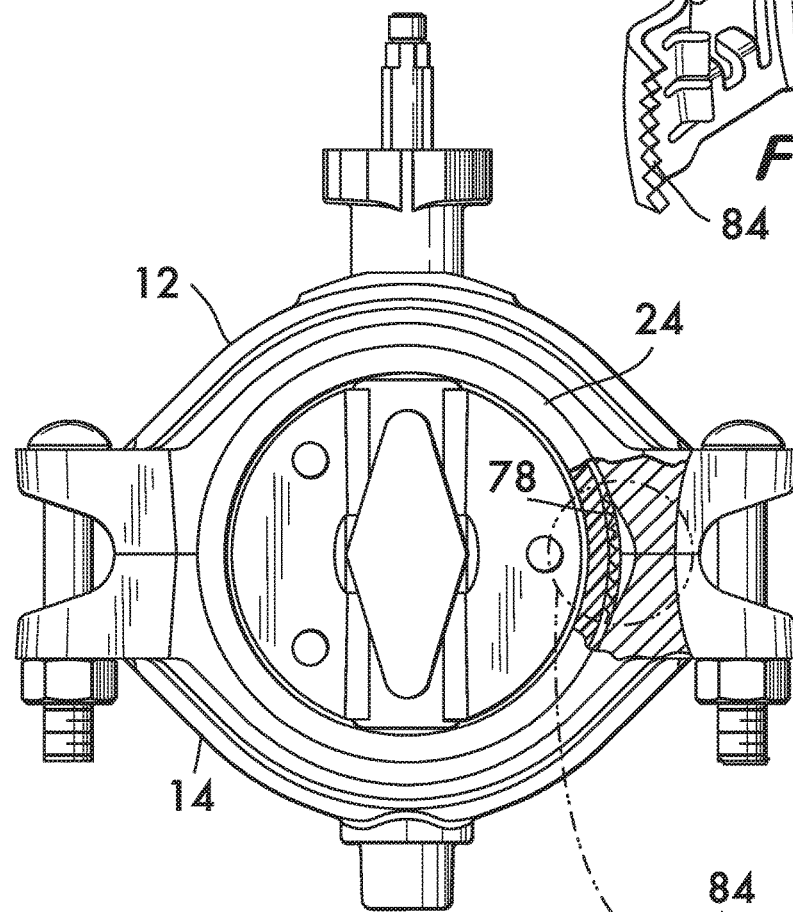
FIG. 12 is an axial view of the combination valve and coupling shown in FIG. 1.
Figure 13:
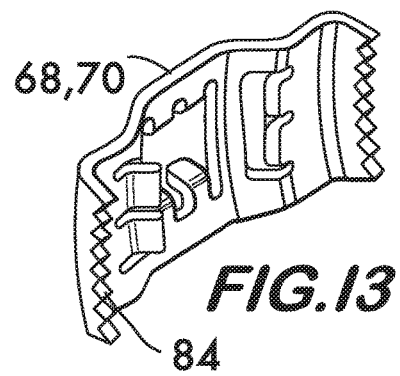
FIG. 13 is an isometric view of a component of the combination valve and coupling shown in FIG. 1.
Figure 14:
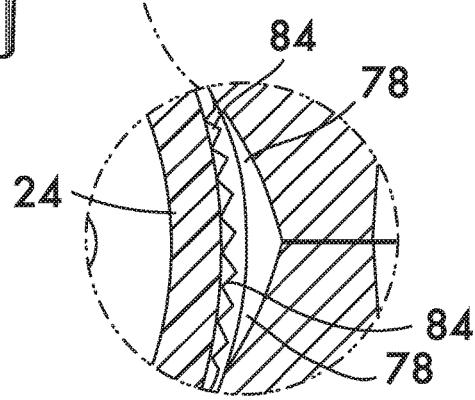
FIG. 14 is a partial view of the combination valve and coupling shown in FIG. 12 on an enlarged scale.

FIGS. 4, 6, 10 and 11 show the valve 10 after the connection members 18 and 20 are adjustably tightened. As shown in FIG. 11, the posts 74 and 76 are accommodated within pockets 78 and 80 facing the central space 16 and positioned adjacent to the connection members 18 and 20 in the segments 12 and 14. Pockets 78 and 80 are defined by angularly oriented ramp surfaces 82 (see FIG. 2) that guide support bodies 68 and 70 into the pockets 78 and 80 as the segments 12 and 14 are drawn together. As shown in FIG. 10, in this configuration the support bodies 68 and 70 help support the lobes 56 and 58 in the vicinity of the connection members to prevent extrusion of the lobes when under pressure. Support for lobes 56 and 58 is through contact with surfaces 72 of the support bodies 68 and 70. As the valve 10 may be heavy for larger diameter pipe elements, with a center of gravity offset from the pipe longitudinal axis, it is advantageous to take measures to prevent rotation of the valve relative to the pipe elements. Anti-rotation features will prevent the valve from rotating under its own weight as well as rotating when a force is applied to actuate the valve, for example when a handle is turned (see FIG. 32). Relative rotation between the valve 10 and pipe elements is prevented in this example as shown in FIGS. 12 and 13 by providing a plurality of teeth 84 on the bodies 68 and 70. Teeth 84 are arranged on opposite sides of the liner 52 and project toward the central space 16 so as to engage the pipe elements 22 and 24 (24 shown) when the segments are drawn toward one another by adjustably tightening the connection members 18 and 20 as shown in FIG. 14.

Figure 15:
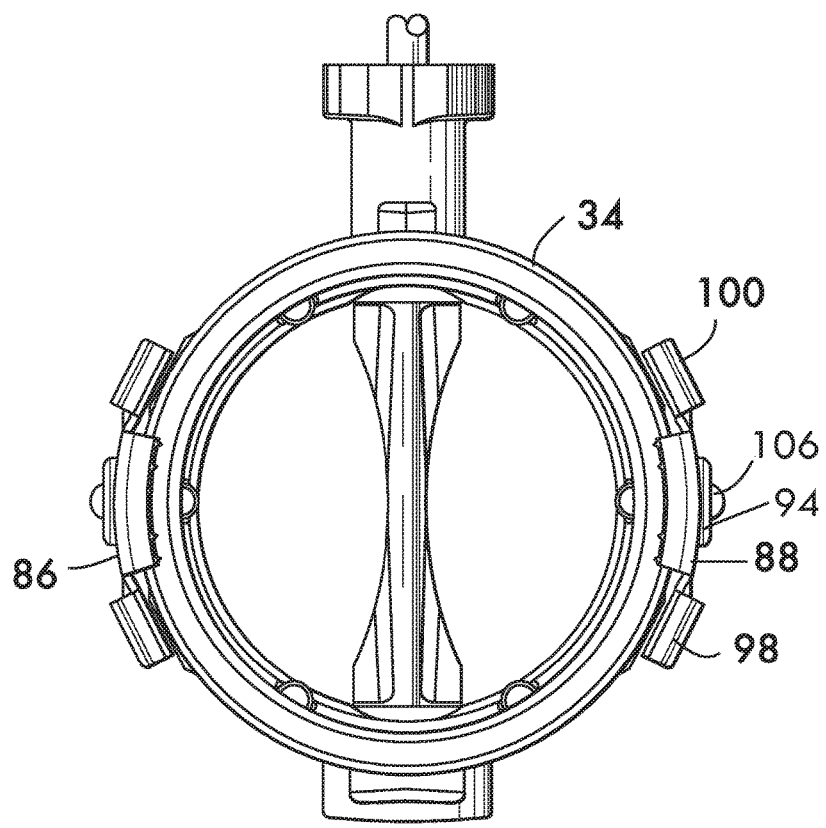
FIG. 15 is an axial view of a valve component of the combination valve and coupling shown in FIG. 1.

Another example support body embodiment is shown in FIG. 15 wherein support bodies 86 and 88 are attached to the valve body 34 at locations corresponding to the interface between the segments 12 and 14 (not shown). Support bodies 86 and 88 are shown in detail in FIG. 16 and each comprises a base 90 having a surface 92 that faces the valve body 34 and a boss 94 that extends away from the central space 16. For valves 10 having support bodies 86 and 88, in the pre-assembled state, the segments 12 and 14 are supported in spaced relation on the bosses 94 and the liner 52. The support bodies 86 and 88 thus cooperate with the liner to support the segments 12 and 14 in spaced relation. The width 96 of bosses 94 determines the spacing between the segments 12 and 14 when in the pre-assembled state and the spacing is sized to permit insertion of the pipe elements into the central space 16. In the example embodiment shown, support bodies 86 and 88 are stamped from metal sheet.

Figure 16:
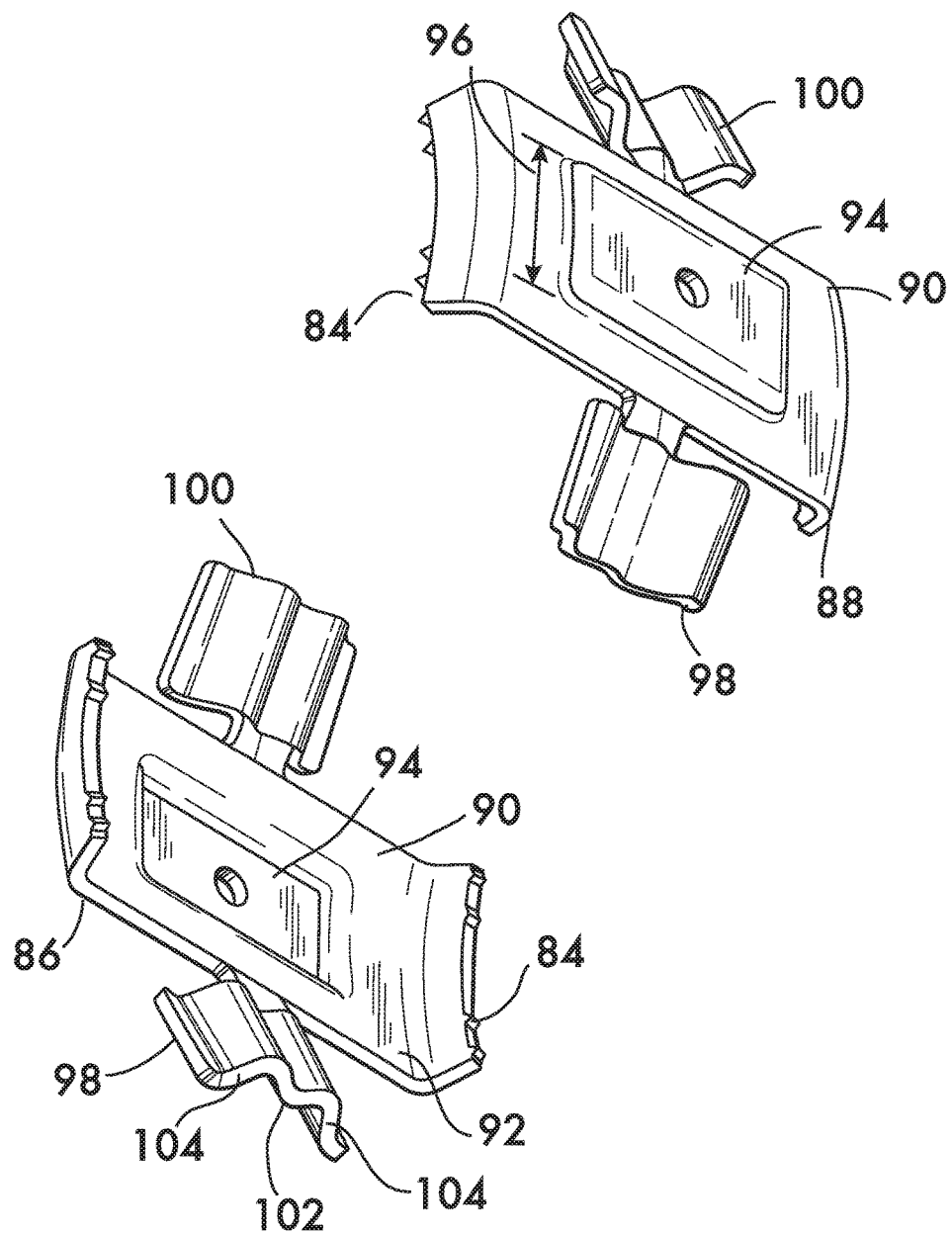
FIG. 16 is an isometric view of components of the combination valve and coupling shown in FIG. 1.
Figure 17:
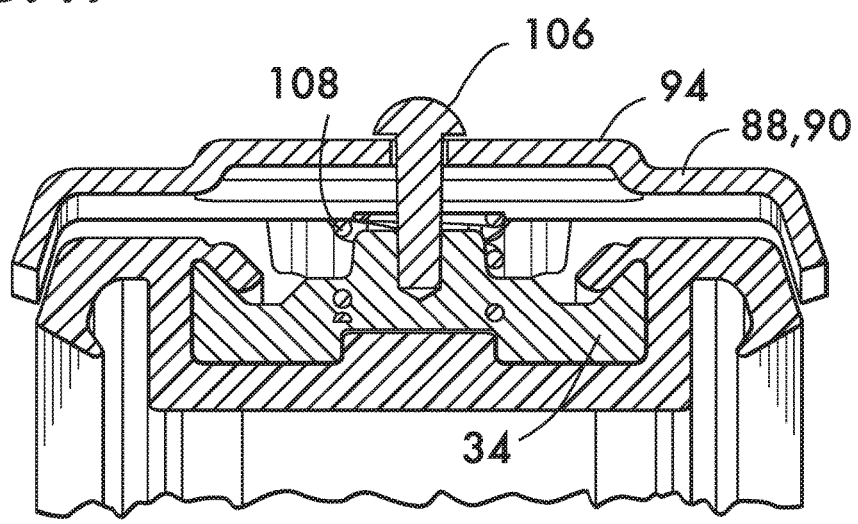
FIG. 17 is a partial cross sectional view of the combination valve and coupling shown in FIG. 1.
Figure 18:
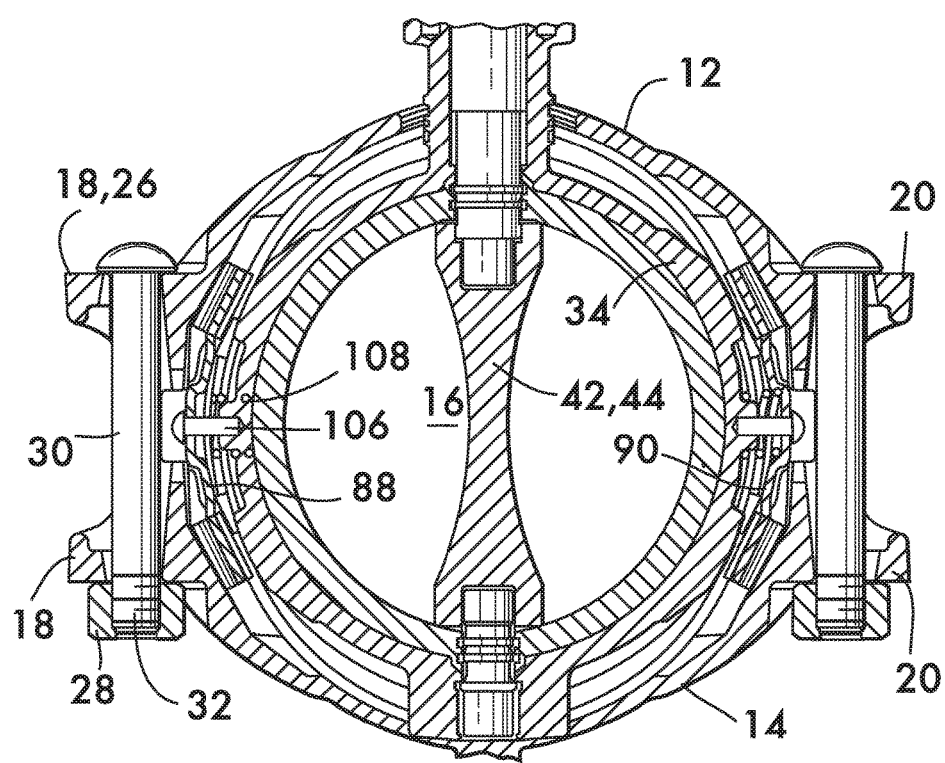
FIG. 18 is cross sectional view of the combination valve and coupling shown in FIG. 1.

As shown in FIG. 15, first and second springs 98 and 100 are positioned adjacent each base 90 at opposite ends of each support body 86 and 88. As shown in FIG. 16, springs 98 and 100 are cantilevered from base 90 in this example, and comprise plates having a "W" cross sectional shape. The cross sectional shape is defined by a vertex 102 positioned between first and second legs 104 on opposite sides of the vertex 102. As shown in FIG. 17, each support body (88 shown) is mounted on the valve body 34 via a fastener 106 that passes through the boss 94. A base spring 108 may be located between the base 90 and the valve body 34 to control radial motion of the support bodies 86 and 88 relative to the valve body. As shown in FIG. 18, base springs 108 locate the support bodies 86 and 88 and bias them outwardly against the segments 12 and 14 and may have a stiffness designed to support the segments in spaced apart relation sufficient to permit pipe elements to be inserted into the central space 16 without disassembling the coupling from its preassembled state.

Figure 19:
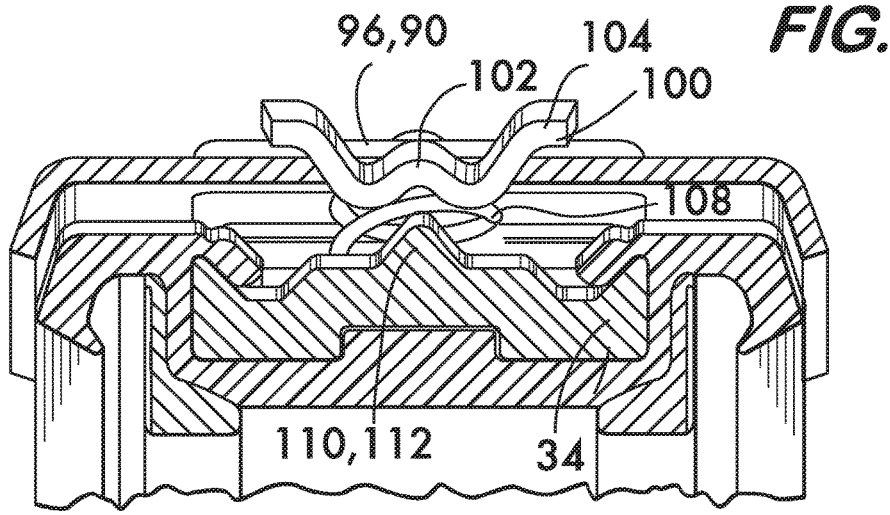
FIG. 19 is a partial cross sectional view of the combination valve and coupling shown in FIG. 1.
Figure 20:
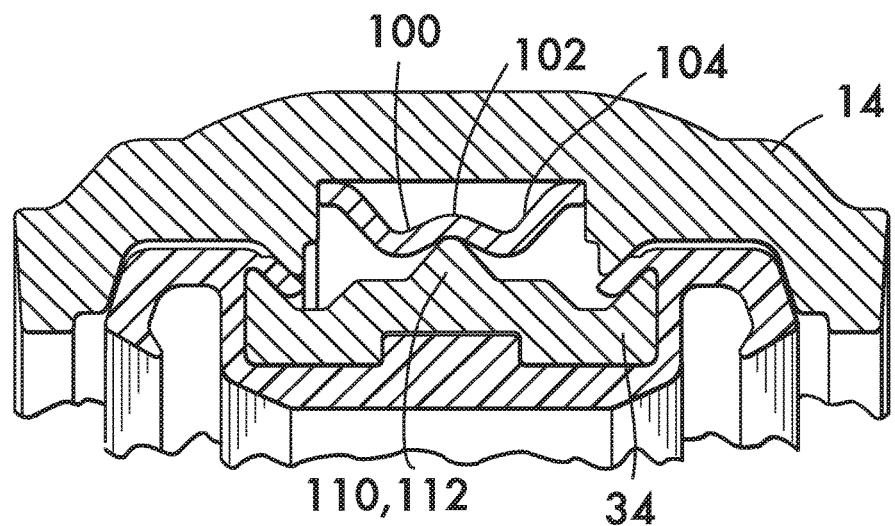
FIGS. 20-25 are partial cross sectional views of the combination valve and coupling shown in FIG. 1.
Figure 21:
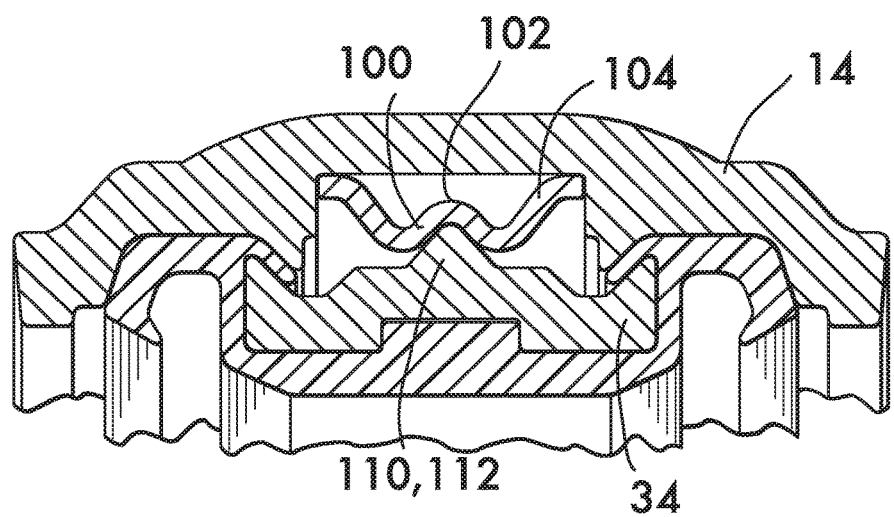

First and second springs 98 and 100 attached to the base 90 of each support body 86 and 88 operate between the valve body 34 and the segments 12 and 14. As shown in FIG. 19, the valve body 34 has an outer profile 110 which is shaped to interfit within and support the vertices 102 of springs 98 and 100 (100 shown). In this example the outer profile 110 comprises a ridge 112 that projects outwardly from the valve body 34, the shape of ridge 112 being complementary to the vertex 102 of springs 98 and 100. Support of the springs 98 and 100 by the ridge 112 allows the legs 104 of the springs 98 and 100 to flexibly support the segments 12 and 14 on the valve body 34 (see FIG. 20). A comparison of FIGS. 20 and 21 shows springs 98 and 100 in action (100 shown). As the connection members 18 and 20 (see FIG. 18) are adjustably tightened to draw the segments 12 and 14 toward the valve body 34, the legs 104 of springs 98 and 100 engage the segments and the vertex 102 of each spring is supported on ridge 112 (FIG. 21). Interposing springs 98 and 100 between the valve body 34 and the segments 12 and 14 helps lock the valve body within the assembly so that the valve body is relatively rigid within the segments 12 and 14. The degree of rigidity is determined by the stiffness of springs 98 and 100. Controlling the rigidity between the valve body 34 and the segments 12 and 14 allows the valve to better withstand high axial loads, encountered when the valve is closed, and leads to better sealing between the disk 44 and the seal (liner 52) and the valve and the pipe elements that are connected. Positioning springs 98 and 100 between the valve body 34 and the segments 12 and 14 also better compensates for dimensional tolerance variations between the various components to provide a tight fit with less tight tolerances.

As shown in FIGS. 3 and 5, each segment 12 and 14 comprises a channel 114 which extends circumferentially around the segments and faces the central space 16. Channels 114 are defined by first and second side surfaces 116 and 118 located on opposite sides of the segments 12 and 14. A back surface 120 extends between the side surfaces. Lobes 56 and 58 are received within the channel 114. In the example embodiment shown, lobes 56 and 58 each comprise respective first and second bands 122. Each band 122 has a first edge 124 attached to ring 54. A second edge 126 is oppositely disposed from the first edge 124 and comprises a sealing surface 128 which faces axis 53 and is engageable with pipe elements to form a fluid tight seal when the valve 10 is joined to pipe elements as described below. As further illustrated in FIG. 3, lobe portions 56*a* and 58*a*, which surround portions of the outer surface 36 of the valve body 34 respectively comprise first and second strips 130. Each strip 130 has a first edge 132 attached to ring 54. Each strip 130 is adjacent to a respective band 122 and extends circumferentially around ring 54. The strips 130 project toward one another, in this example parallel to axis 53.

Figure 30:
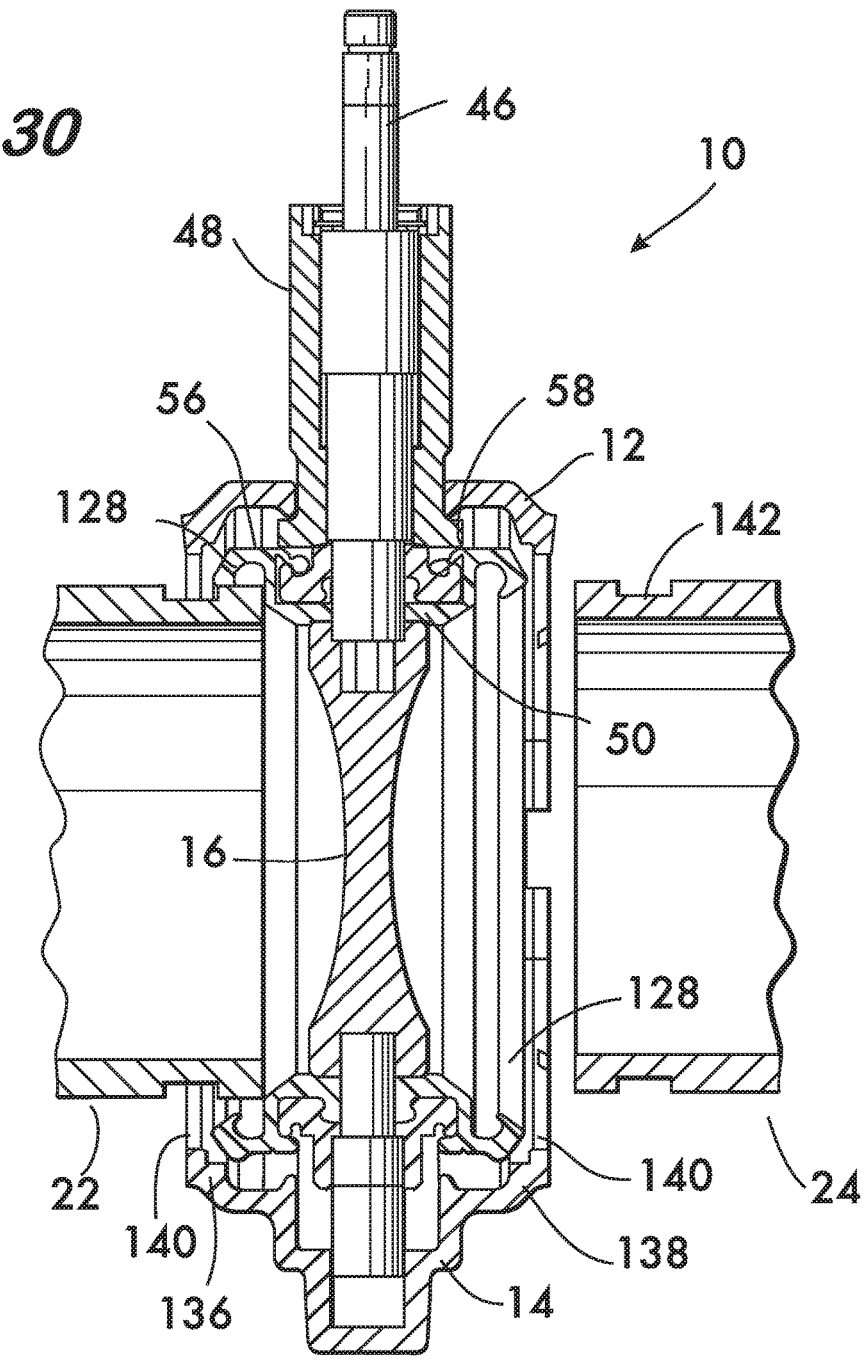
Figure 31:
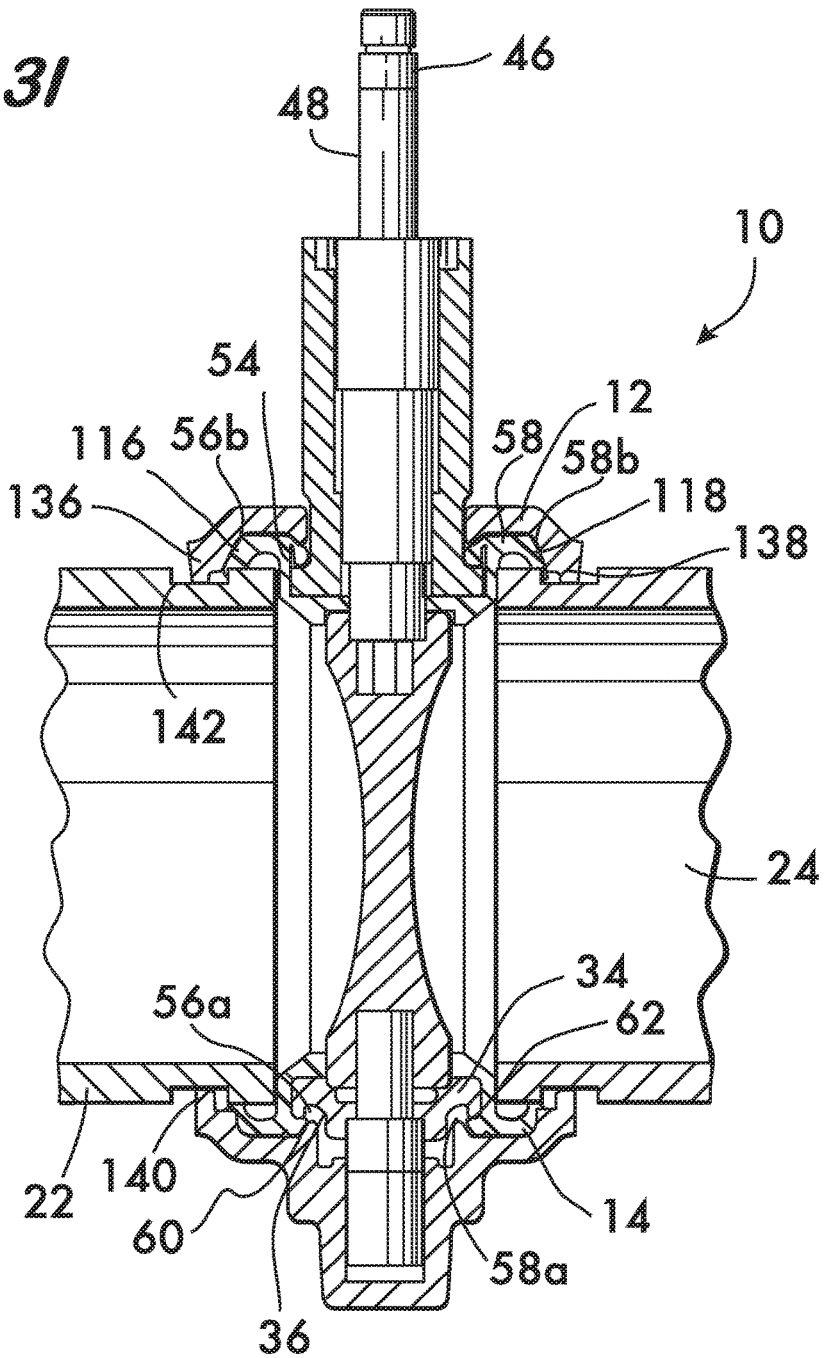

The first lobe 56 has a first lobe surface 56*b* that faces toward the first side surface 116 of channel 114. The second lobe 58 has a second lobe surface 58*b* that faces toward the second side surface 118. FIGS. 4 and 6 show the lobes 56 and 58 seated within the channels 114 which occurs when the connection members 18 and 20 (see FIG. 1) are adjustably tightened to draw the segments 12 and 14 toward one another to form a joint between pipe elements. When the lobes 56 and 58 are seated within the channel 114, the lobe surfaces 56*b* and 58*b* come into contact with respective side surfaces 116 and 118. The lobes 56 and 58 are thus deformed toward a center 134 of the channel 114. During seating the lobes 56 and 58 are compressed between the segments 12 and 14 and the pipe elements 22 and 24. The sealing surfaces 128 of lobes 56 and 58 contact the outer surfaces of pipe elements 22, 24 and form a fluid tight seal as shown in FIGS. 30 and 31. Mechanical engagement between valve 10 and the pipe elements 22, 24 is effected by first and second keys 136 and 138 positioned on opposite sides of each segment 12 and 14. Each key 136, 138 extends circumferentially around the central space 16 and projects toward it. Each key has an arcuate surface 140 that engages a respective pipe element 22, 24. In this example the mechanical engagement is through a key engaging a circumferential groove 142 in the pipe elements 22 and 24 (see FIGS. 30 and 31). The valve 10 is not limited to grooved pipe, but is also compatible with plain end as well as shoulder end pipe.

As shown in FIG. 3, when undeformed, lobe surfaces 56b and 58b are angularly oriented with respect to respective side surfaces 116 and 118 of the channel 114. In the example embodiment shown, angular orientation of the lobes 56 and 58 is effected by angularly orienting bands 122 forming the lobes. Orientation angles 144 from about 10° to about 30° are practical, and an orientation angle of about 20° is advantageous for certain embodiments. As further illustrated in FIG. 3, a width 146 of the ring 54 between the first and second lobe surfaces 56b and 58b is wider than the widest distance 148 between the first and second side surfaces 116 and 118 of channel 114. These geometrical relationships, i.e., the angular relation between surfaces 56b and 116 and 58b and 118, or the width relation, between the lobes 56 and 58 of ring 54 and the channels 114 of segments 12 and 14 provide for the deformation and sealing effect of the lobes against the pipe elements when they are seated within the channels when the segments 12 and 14 are drawn together to form a joint.

Figure 3A:
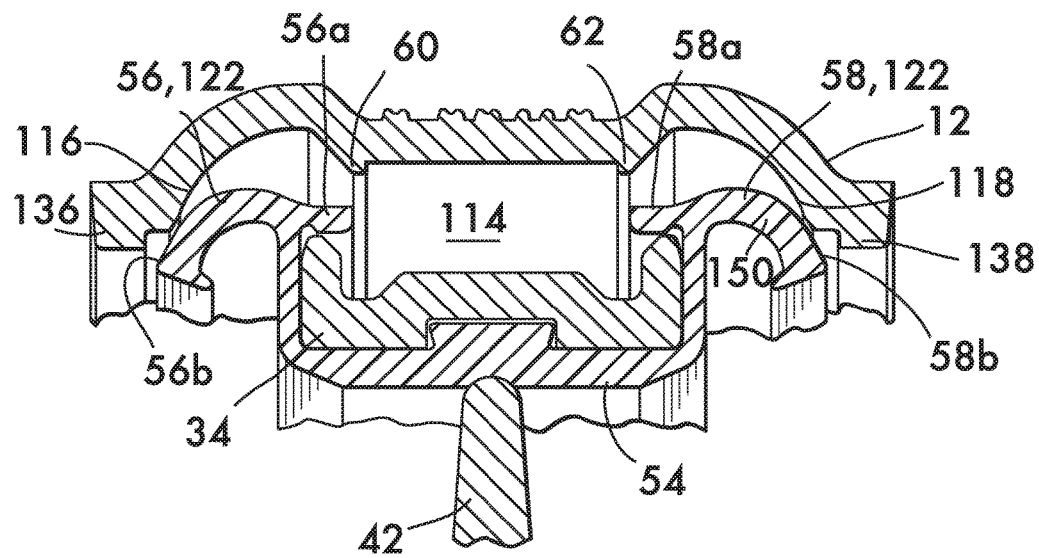
Figure 22:
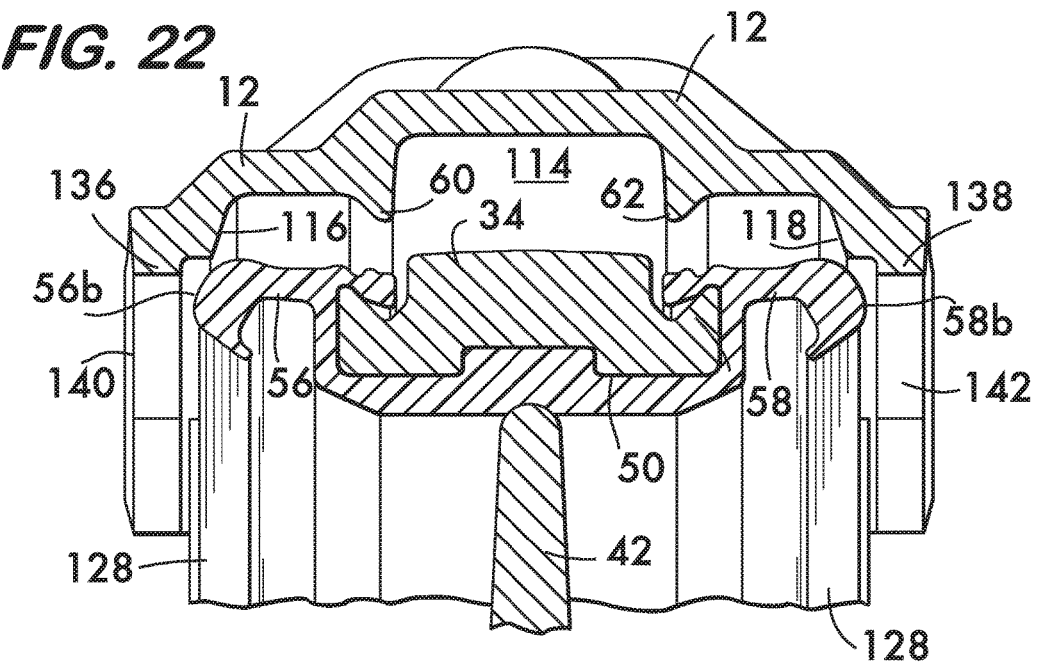
Figure 23:
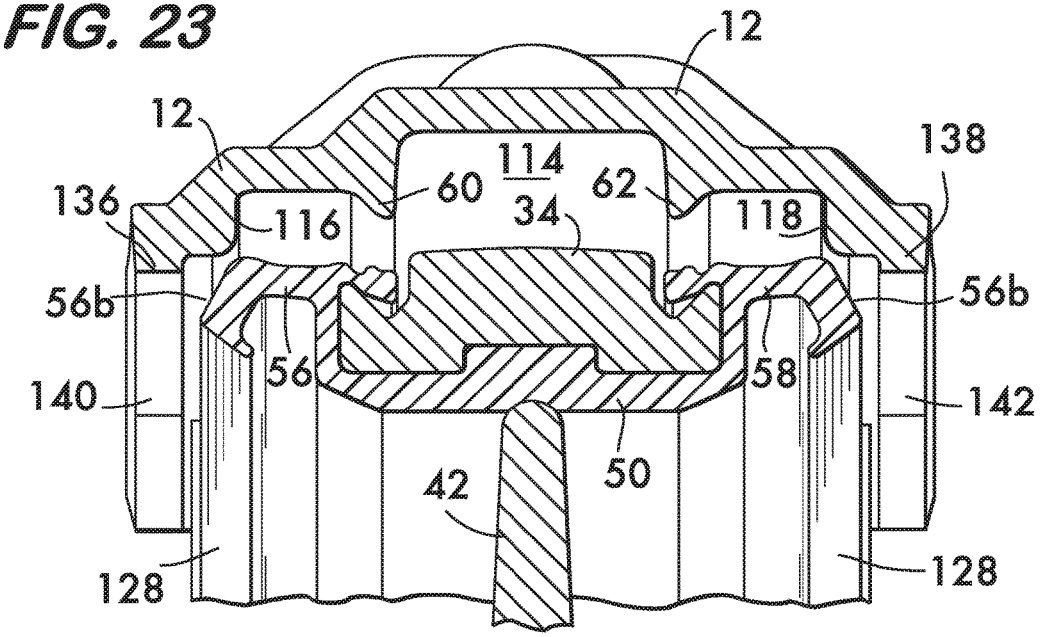
Figure 24:
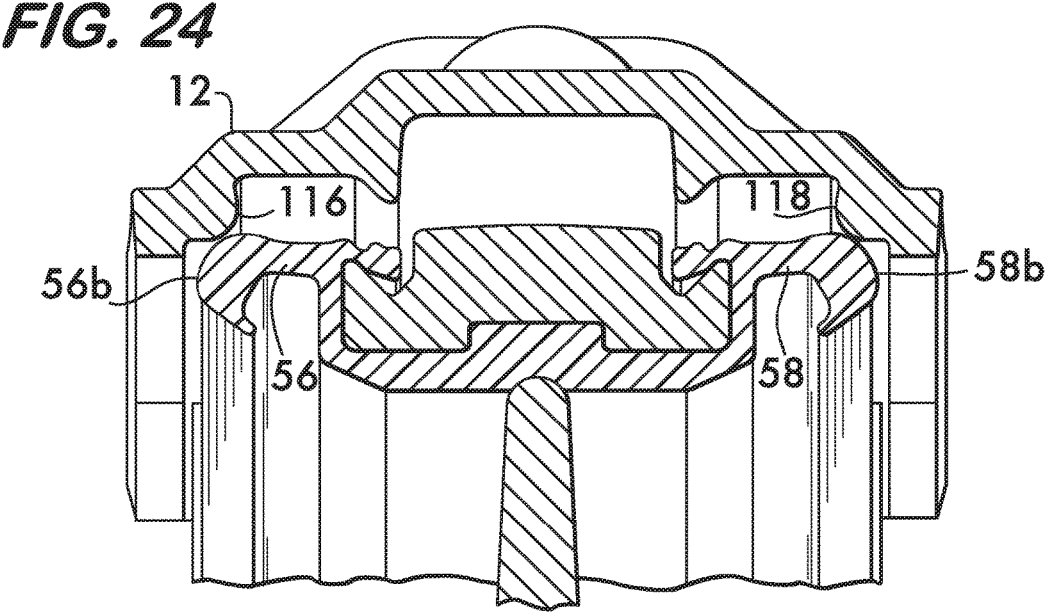
Figure 25:
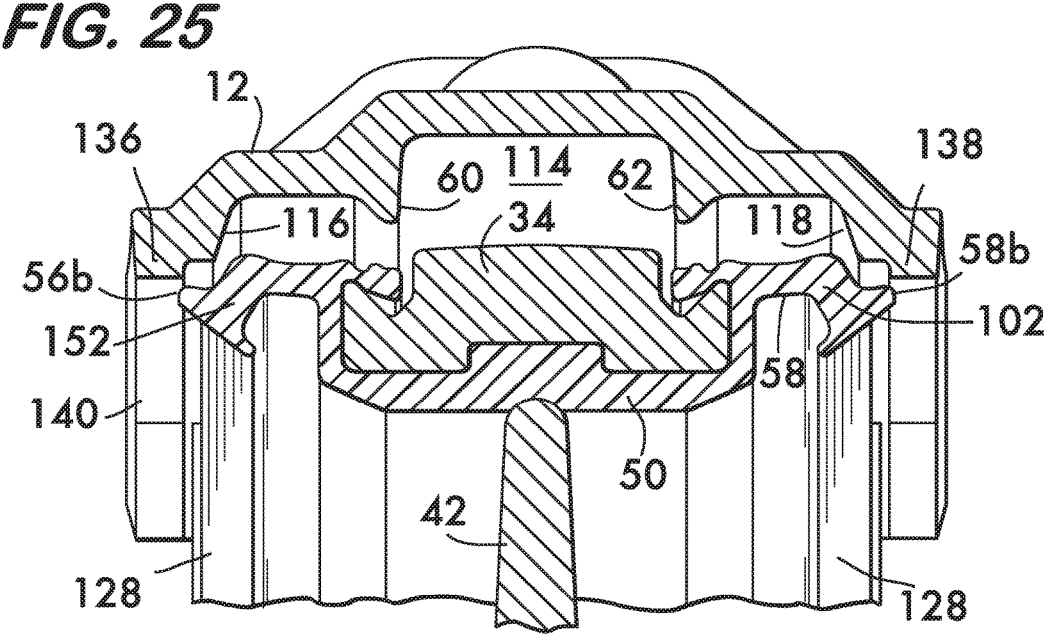

FIG. 3A shows another embodiment of ring 54 wherein the bands 122 forming the lobes 56 and 58 each have an arcuate cross sectional shape 150. The sealing effect can be further augmented by design of the undeformed shape of the lobe surfaces 56b and 58b, as well as the shape of the side surfaces 116 and 118. As shown in FIG. 22, when undeformed, first and second lobe surfaces 56b and 58b may be convexly curved; FIG. 23 shows side surfaces 116 and 118 as being convexly curved and FIG. 24 shows both the lobe surfaces 56b and 58b and the side surfaces 116 and 118 as convexly curved. FIG. 25 shows a design wherein the lobes 56 and 58 are displaced toward the central space 16 by respective extension portions 152.

Figure 26:
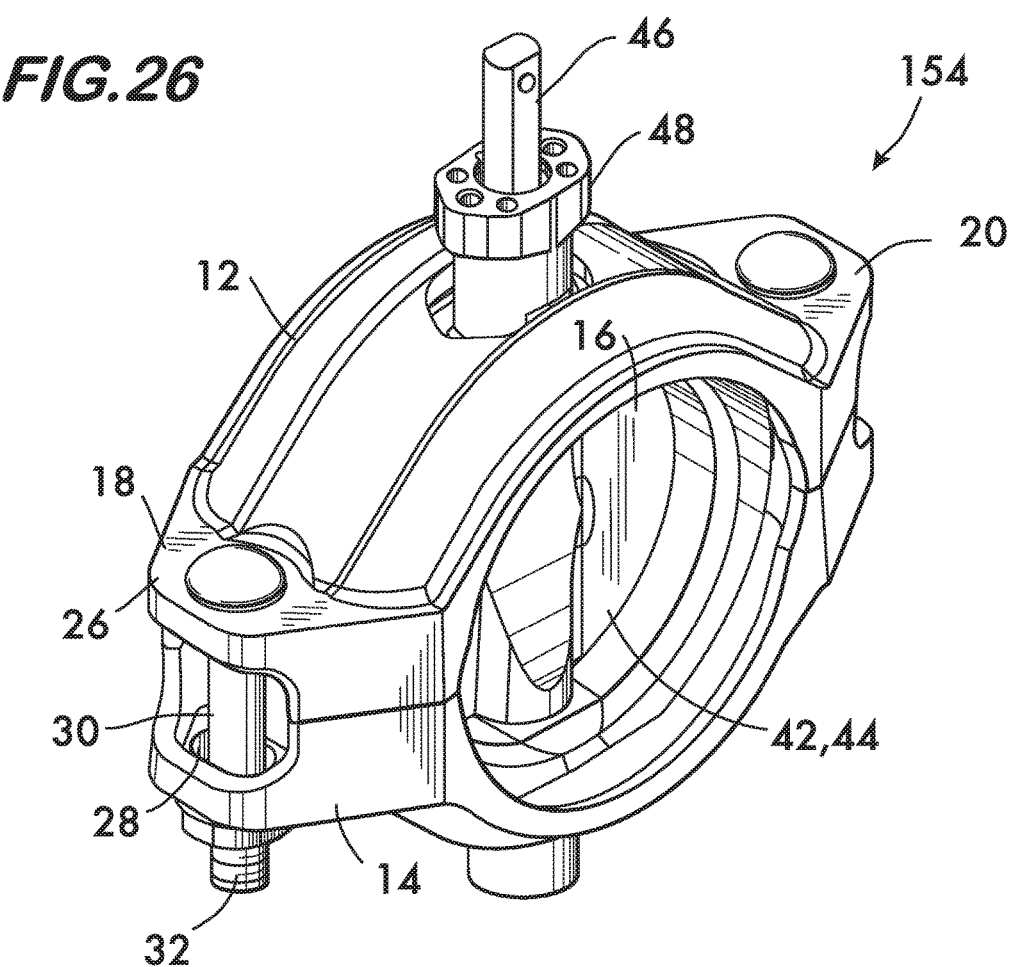
FIG. 26 is an isometric view of another example embodiment of a combination valve and coupling according to the invention.
Figure 27:
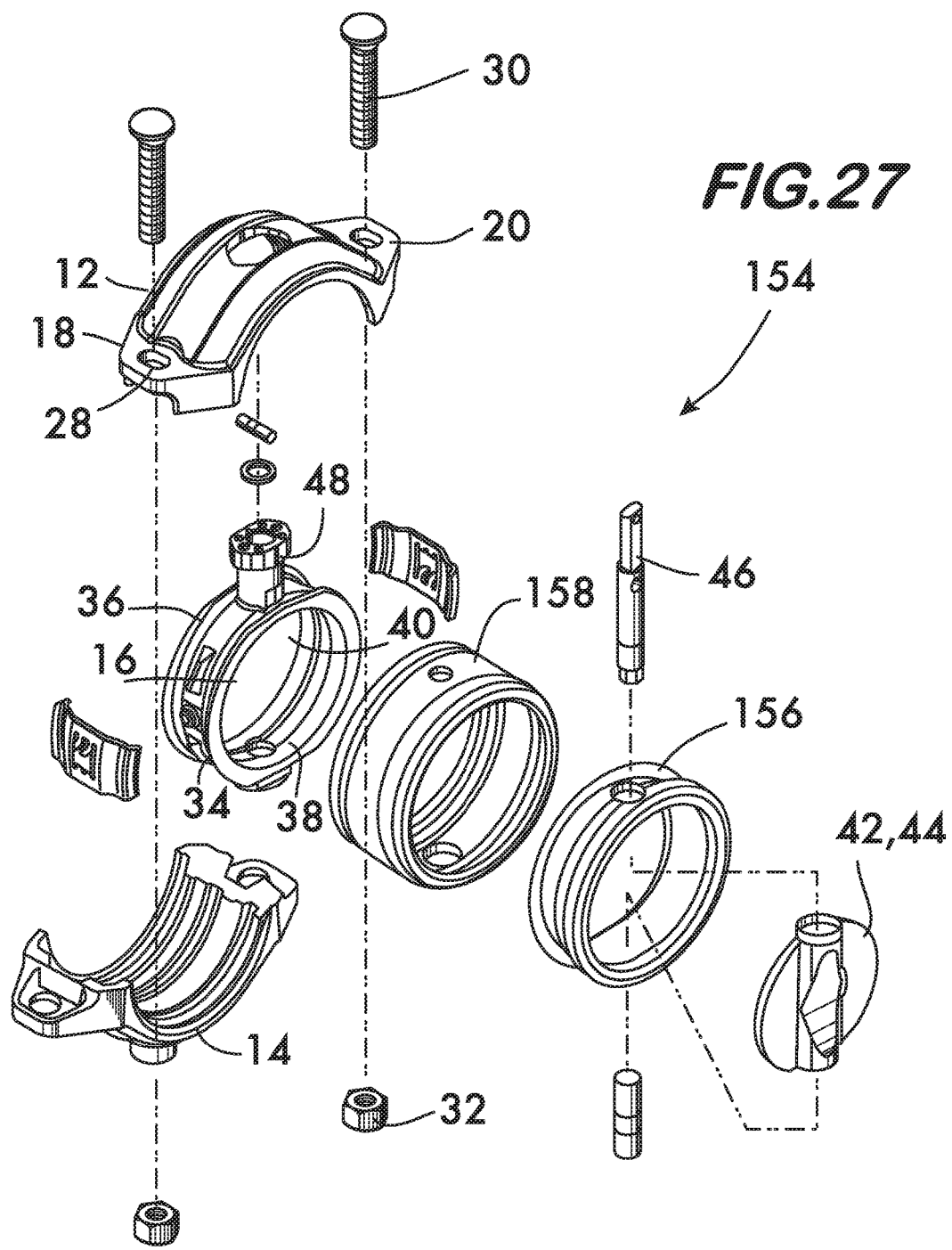
FIG. 27 is an exploded isometric view of the combination valve and coupling shown in FIG. 26.
Figure 28:
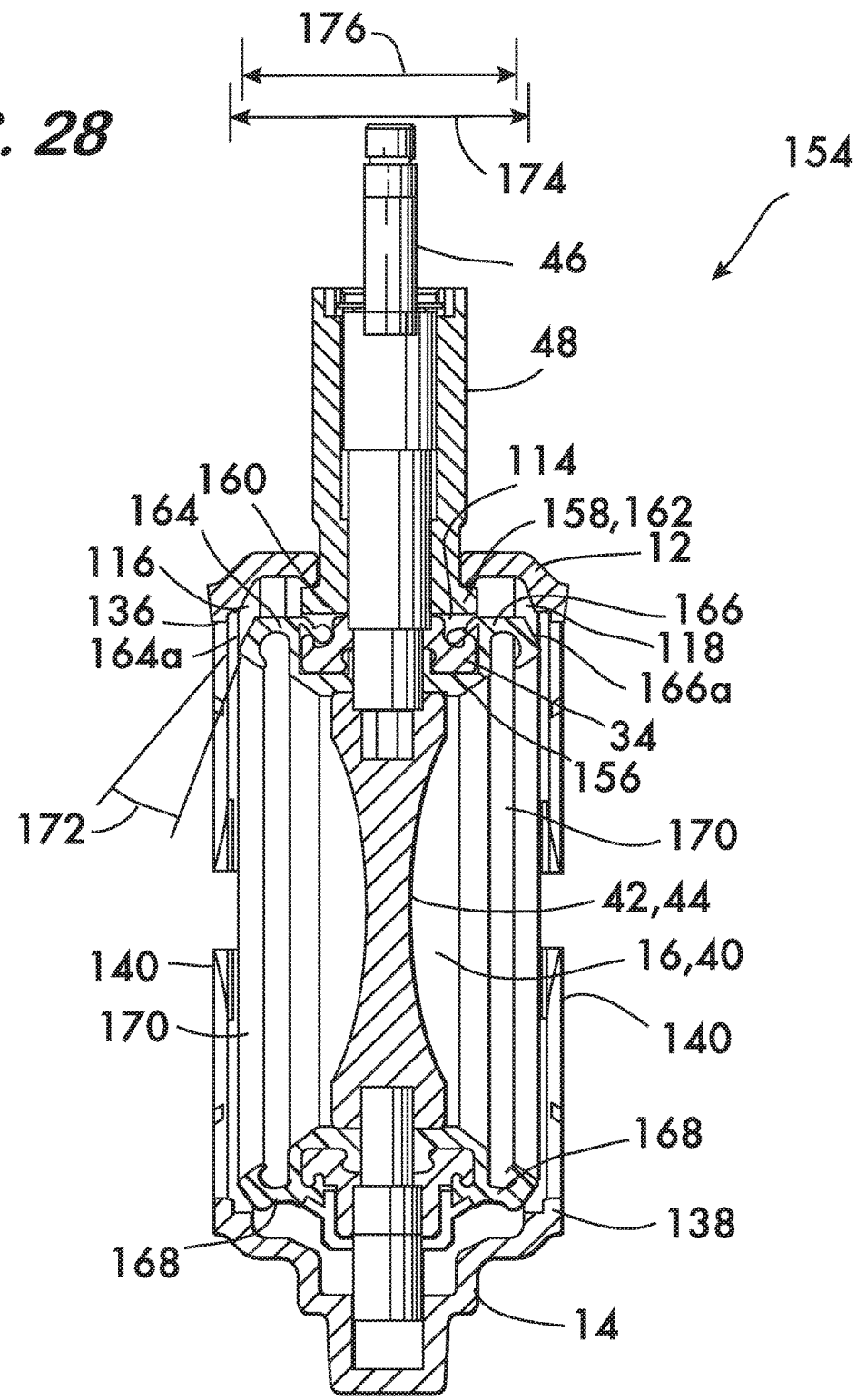
FIGS. 28-31 are longitudinal sectional views of the combination valve and coupling shown in FIG. 26.

Another example valve embodiment 154 encompassed by the invention is shown in FIGS. 26-28. Valve 154 differs from valve 10 in that the sealing configuration comprises a liner 156 and a shroud 158. (The other components of valve 154 are substantially the same as those of valve 10 and therefore it is not necessary to repeat their description.) Liner 156 and shroud 158 are made of a flexible, resilient material such as elastomers or urethanes. As shown in FIGS. 27 and 28, liner 156 is positioned within the valve body 34 and surrounds the bore 40 defined by the valve body. Liner 156 sealingly engages the valve closing member 42 (in this example, disk 44) when it is in the closed configuration. As shown in FIG. 28, portions 160 of liner 156 extend around the valve body to a position between the valve body 34 and the segments 12 and 14 where the portions 160 engage the shroud 158. Engagement between the liner portions 160 and the shroud 158 effect a seal between the valve body 34 and the segments 12 and 14.

Figure 29:
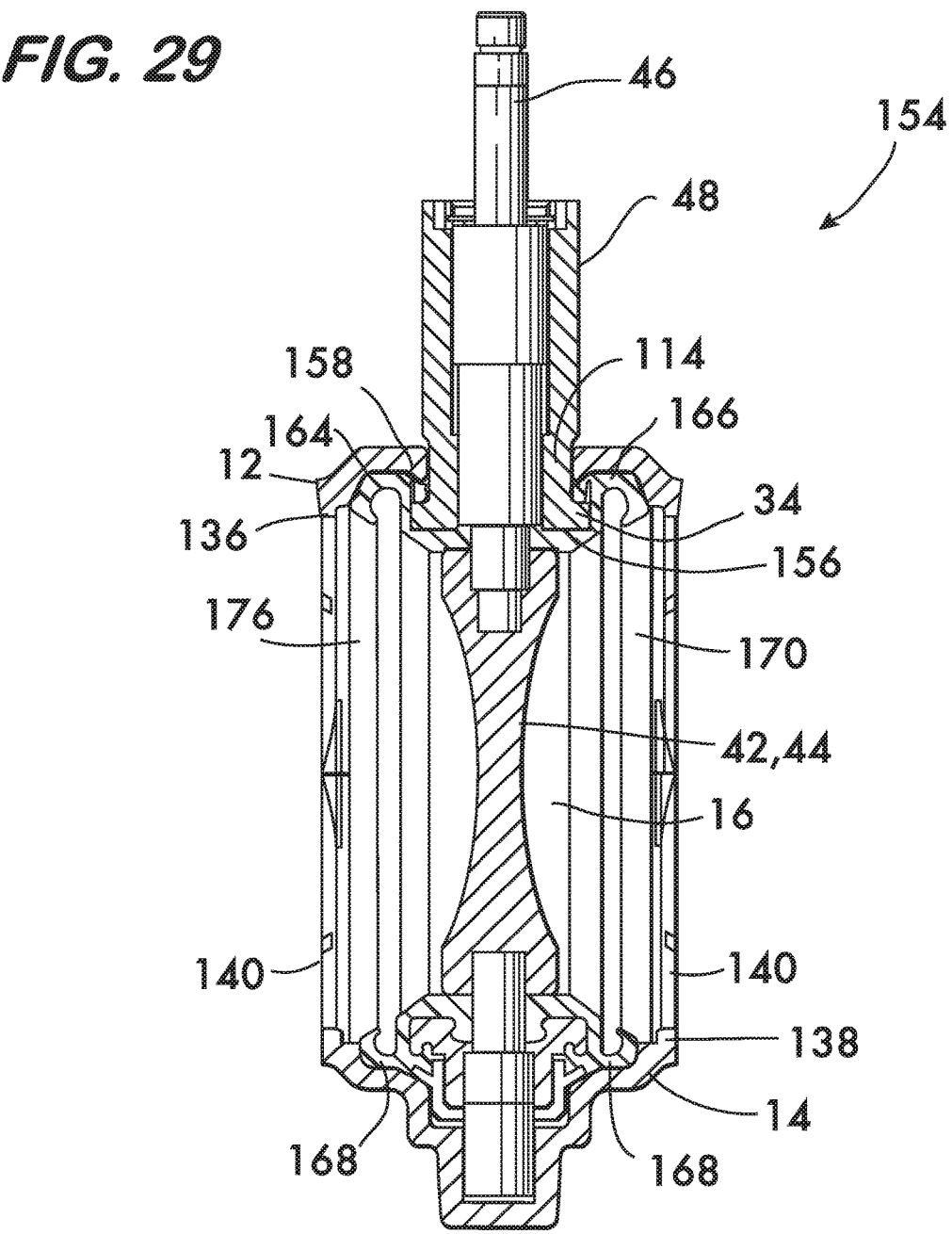

Shroud 158 comprises a ring 162 having first and second lobes 164 and 166 positioned on opposite sides. Lobes 164 and 166 are received within the channel 114 of segments 12 and 14. The first lobe 164 has a first lobe surface 164a that faces toward the first side surface 116 of channel 114. The second lobe 166 has a second lobe surface 166a that faces toward the second side surface 118. FIG. 29 shows the lobes 164 and 166 seated within the channels 114 which occurs when the connection members 18 and 20 (see FIG. 26) are adjustably tightened to draw the segments 12 and 14 toward one another to form a joint between pipe elements. When the lobes 164 and 166 are seated within the channel 114, the lobe surfaces 164a and 166a come into contact with respective side surfaces 116 and 118 (compare FIGS. 28 and 29). The lobes 164 and 166 are thus deformed toward a center 134 (not shown, see FIG. 3 for reference) of the channel 114. During seating the lobes are compressed between the segments 12 and 14 and the pipe elements 22 and 24 (not shown). Furthermore, the shroud 158 is compressed between the segments 12, 14 and the valve body 34. Each lobe 164 and 166 comprises a respective band 168 having a sealing surface 170 that contacts the outer surface of a pipe element 22, 24 and forms a fluid tight seal. As with valve 10, mechanical engagement between valve 154 and the pipe elements 22, 24 is effected by first and second keys 136 and 138 positioned on opposite sides of each segment 12 and 14. Each key 136, 138 extends circumferentially around the central space 16 and projects toward it. Each key has an arcuate surface 140 that engages a respective pipe element 22, 24. In this example the mechanical engagement is through a key engaging a circumferential groove 142 in the pipe elements 22 and 24 (see FIGS. 30 and 31). The valve 154 is not limited to grooved pipe, but is also compatible with plain end as well as shoulder end pipe.

As shown in FIG. 28, when undeformed, lobe surfaces 164a and 166a are angularly oriented with respect to respective side surfaces 116 and 118 of the channel 114. Orientation angles 172 from about 10° to about 30° are practical, and an orientation angle of about 20° is advantageous for certain embodiments. As further illustrated in FIG. 28, a width 174 of the shroud 158 between the first and second lobe surfaces 164a and 166a is wider than the widest distance 176 between the first and second side surfaces 116 and 118. These geometrical relationships, i.e., the angular relation between surfaces 164a and 116 and 166a and 118, or the width relation between the lobes 164 and 166 of shroud 158 and the channels 114 of segments 12 and 14 provide for the deformation and sealing effect of the lobes against the pipe elements when they are seated within the channels when the segments 12 and 14 are drawn together to form a joint.

The sealing effect can be augmented by design of the undeformed shape of the lobe surfaces 164a and 166a, as well as the shape of the side surfaces 116 and 118. Reference is made to FIGS. 22-25 wherein the lobe surfaces 164a and 166a and the surfaces 116 and 118 may take the same configurations as shown for lobe surfaces 56a and 58a. The use of the shroud 158 in conjunction with the liner 156 and its portions 160 prevents dislocation of the liner 156 relative to the valve body 34 that may be caused by the action of valve closing member 42 against liner 156 when the valve is operated. The engagement between segments 12 and 14 with shroud 158 when segments 12 and 14 are brought together to form a joint also serves to locate valve body 34 relative to segments 12 and 14 via the compressive forces exerted by segments 12 and 14 through shroud 158, liner 156 and its portions 160, and against valve body 34.

Figure 32:
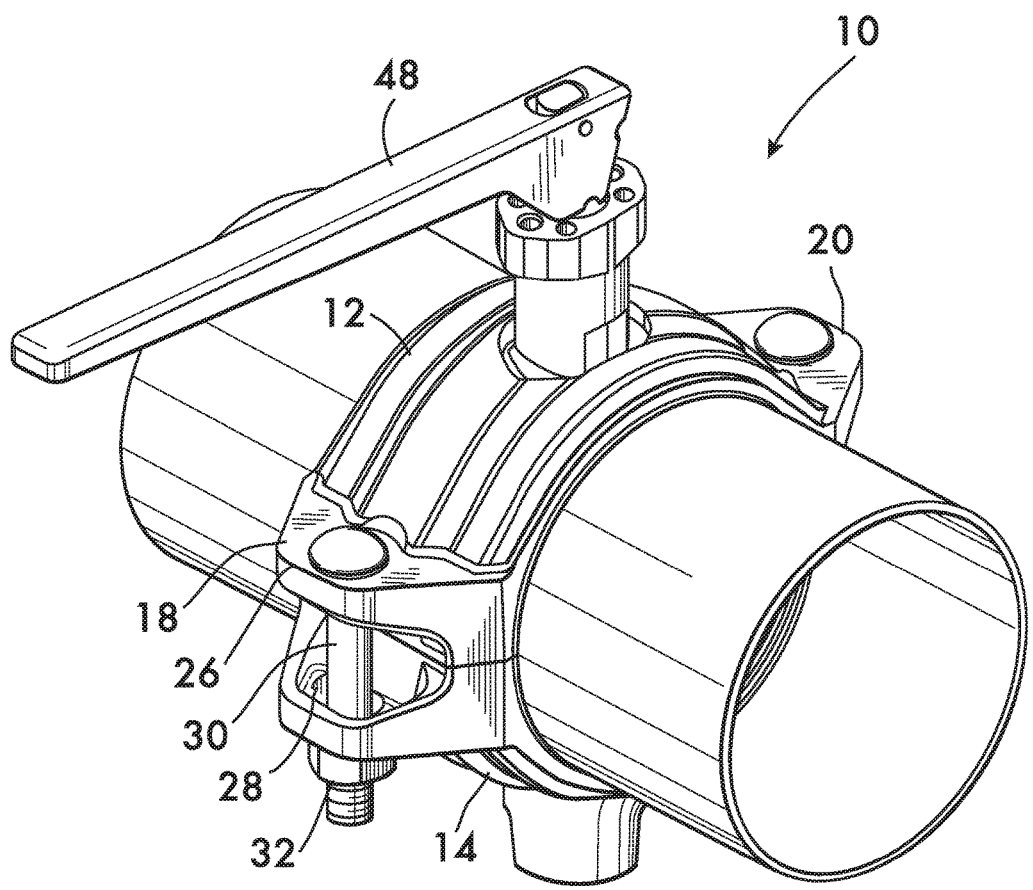
FIG. 32 is an isometric view of an example embodiment of a combination valve and coupling according to the invention.

FIGS. 30-32 illustrate formation of a pipe joint using a valve according to the invention. By way of example, valve embodiment 10 is illustrated, it being understood that a description using embodiment 154 would be substantially similar.

As shown in FIG. 30, valve 10 is in the pre-assembled configuration with the segments 12 and 14 held in spaced apart relation, supported on posts 74 and 76 of support bodies 68 and 70 (see also FIGS. 7 and 8), those bodies finding support on the lobes 56 and 58 of the liner 52. (In an alternate embodiment using support bodies 86 and 88, the segments 12 and 14 would be supported on the bosses 94, see FIG. 16.) The segments are also directly supported by contact with the lobes. Fasteners (bolts 30, nuts 32) hold the segments against the lobes 56, 58 and posts 74, 76. The separation of the segments 12 and 14 is sufficient to permit insertion of the pipe elements. As shown, pipe element 22 is inserted and pipe element 24 is about to be inserted into the central space 16. Upon insertion, the outer surface of the pipe elements engage the sealing surfaces 128 on each lobe 56, 58.

As shown in FIG. 31, once the pipe elements 22, 24 are inserted the connection members 18, 20 (see also FIG. 11) are adjustably tightened (bolts 30 and nuts 32 tightened), thereby drawing the segments 12 and 14 toward one another. As the segments approach each other the first and second side surfaces 116, 118 respectively engage lobe surfaces 56b and 58b, thereby deforming the lobes 56, 58 (see also FIGS. 3 and 4) and compressing them between the segments 12 and 14 and the outer surfaces of pipe elements 22, 24 to form a fluid tight seal about the pipe elements. Springs 98 and 100 are also compressed between the valve body 34 and the segments 12 and 14 (see also FIGS. 20 and 21) as well as base springs 108 when present (see FIG. 17). Contemporaneously, the circumferentially arranged projections 60, 62 on segments 12 and 14 respectively engage lobe portions 56a and 58a (i.e., strips 130 in this example embodiment, see FIGS. 3 and 4). This engagement compresses the lobe portions 56a and 58a between the segments and the outer surface 36 of the valve body 34, preventing the dislocation of liner 52 when valve 10 is operated and aiding in the location of valve body 34 relative to segments 12 and 14. To effect compression of the lobes and lobe portions the support bodies 74 and 76 are forced home into their respective pockets 78 and 80 (see FIG. 11), the support bodies 74 and 76 moving inwardly so that the segments fall off of the posts 74 and 76 and permit the segments 12 and 14 to approach one another. Mechanical engagement between the segments 12 and 14 and the pipe elements 22 and 24 is also effected when the arcuate surfaces 140 on keys 136 and 138 engage the outer surfaces of the pipe elements, in this example engaging circumferential grooves 142 of the pipe elements. When present, teeth 84 on support bodies 68 and 70 (see FIGS. 12-14) grip the outer surfaces of the pipe element 22 and 24 to inhibit relative rotation between the pipe elements and the valve 10. As shown in FIG. 32, installation is complete for this example valve when the segments 12 and 14 meet in what is known as "pad to pad" engagement. In other example embodiments installation is complete when the fasteners are tightened to a specified torque.

Installation of the valve 10 to form a joint also illustrates a method of joining the pipe elements wherein the valve body 34 is centered and secured within the central space 16 defined by the segments 12 and 14. This method is illustrated in FIGS. 30, 31, 3 and 4. As shown in FIGS. 30 and 31, the pipe elements are inserted into the central space 16 from opposite sides of the valve 10. The segments 12 and 14 are drawn toward the central space 16 by tightening of the connection members 18 and 20 (see also FIG. 32). While the segments are drawn toward one another, as shown in FIGS. 3 and 4, the circumferentially arranged projections 60 and 62 are brought into engagement with the valve body 34. Engagement in this example is by circumferential contact between the projections 60 and 62 and the valve body 34, it being understood that if the projections 60, 62 were intermittent as in the example embodiment of FIG. 2A then the contact between the projections and the grooves would also be intermittent. Centering and securing the valve body 34 within the central space 16 is effected by engaging projections 60 and 62 with respective circumferential grooves 64 and 66 in the valve body. Engagement in this example is by circumferential contact between the projections 60, 62 and their respective grooves 64 and 66, it being understood that if the projections 60, 62 were intermittent as in the example embodiment of FIG. 2A then the contact between the projections and the grooves would also be intermittent.

It is expected that valves according to the invention will provide greater efficiency for joint formation, thereby providing a significant advantage to the initial installation and maintenance of piping networks.

What is claimed is:

1. A valve, comprising:
no more than two segments attached end to end surrounding a central space, each of said segments having first and second projections arranged in spaced apart relation to one another, said projections extending circumferentially about and extending toward said central space, each of said segments comprising a channel extending circumferentially around and facing said central space, each of said channels being defined by first and second side surfaces located on opposite sides of said segments and a back surface extending between said side surfaces;
a valve body positioned within said central space, said valve body having an outer surface facing said segments and an inner surface defining a bore therethrough, said first and second projections being engageable with said outer surface for securing said valve body within said central space;
a closing member positioned within said bore, said closing member being movable between an open and a closed configuration;
a stem attached to said closing member for moving said closing member between said open and said closed configuration;
a liner overlying said inner surface of said valve body and surrounding said bore, said liner sealingly engaging said closing member when in said closed configuration, said liner further comprising a ring having first and second lobes positioned on opposite sides thereof, said first lobe having a first lobe surface facing toward said first side surface and said second lobe having a second lobe surface facing toward said second side surface, a portion of said first lobe surrounding a first portion of said outer surface of said valve body, said first projections engaging said portion of said first lobe, a portion of said second lobe surrounding a second portion of said outer surface of said valve body, said second projections engaging said portion of said second lobe; and
first and second connection members positioned at opposite ends of said segments for effecting end to end attachment of said segments; wherein when said lobes are seated within said channel, at least a portion of said first and second lobe surfaces come into contact respectively with said first and second side surfaces such that said lobes deform toward a center of said channel.

2. The valve according to claim 1, wherein said first lobe surface is oriented angularly with respect to said first side surface and said second lobe surface is oriented angularly with respect to said second side surface when said lobes are undeformed.

3. The valve according to claim 1, wherein said first and second lobe surfaces comprise convexly curved surfaces when said lobes are undeformed.

4. The valve according to claim 1, wherein said closing member comprises a disk rotatably mounted within said valve body.

5. The valve according to claim 1, wherein each of said segments further comprises first and second keys positioned on opposite sides of said segments, each of said keys extending circumferentially around and projecting toward said central space.

6. The valve according to claim 5, wherein each of said keys comprises an arcuate surface engageable with a pipe element positioned within said central space.

7. The valve according to claim 1, wherein said projections are circumferentially continuous.

8. The valve according to claim 1, wherein said projections are circumferentially intermittent.

9. The valve according to claim 1, further comprising:
a first support body positioned adjacent to said first connection member, said first support body having a surface facing said valve body and first and second posts in spaced apart relation extending away from said central space, said first post engaging a first segment of said plurality of segments, said second post engaging a second segment of said plurality of segments;
a second support body positioned adjacent to said second connection member, said second support body having a surface facing said valve body and first and second posts in spaced apart relation extending away from said central space, said first post of said second support body engaging said first segment, said second post of said second support body engaging said second segment; wherein
said surfaces of said first and second support bodies engage said liner, said posts engage said segments, whereby said first and second support bodies cooperate with said liner to support said first and second segments in spaced apart relation in a pre-assembled configuration.

10. A valve, comprising:
a plurality of segments attached end to end surrounding a central space, each of said segments comprising first and second circumferentially arranged projections extending toward said central space, each of said segments comprising a channel extending circumferentially around and facing said central space, each of said channels being defined by first and second side surfaces located on opposite sides of said segments and a back surface extending between said side surfaces;
a valve body positioned within said central space, said valve body having an outer surface facing said segments, said outer surface having first and second grooves therein arranged in spaced apart relation to one another, said grooves extending circumferentially about said central space, said valve body further comprising an inner surface defining a bore therethrough, said first and second circumferentially arranged projections being engageable with said outer surface of said valve body for securing said valve body within said central space;
a closing member positioned within said bore, said closing member being movable between an open and a closed configuration;
a liner overlying said inner surface of said valve body and surrounding said bore, said liner sealingly engaging said closing member when in said closed configuration, said liner further comprises a ring having first and second lobes positioned on opposite sides thereof, said first lobe having a first lobe surface facing toward said first side surface and said second lobe having a second lobe surface facing toward said second side surface, a portion of said first lobe surrounding a first portion of said outer surface of said valve body, said first projections engaging said portion of said first lobe, a portion of said second lobe surrounding a second portion of said outer surface of said valve body, said second projections engaging said portion of said second lobe;
a stem attached to said closing member for moving said closing member between said open and said closed configuration; and
first and second connection members positioned at opposite ends of at least two of said segments for effecting end to end attachment of said segments; wherein
when said lobes are seated within said channel, at least a portion of said first and second lobe surfaces come into contact respectively with said first and second side surfaces such that said lobes deform toward a center of said channel.

11. The valve according to claim 10, wherein said first lobe surface is oriented angularly with respect to said first side surface and said second lobe surface is oriented angularly with respect to said second side surface when said lobes are undeformed.

12. The valve according to claim 10, wherein said first and second lobe surfaces comprise convexly curved surfaces when said lobes are undeformed.

13. The valve according to claim 10, comprising only two of said segments.

14. The valve according to claim 10, wherein said closing member comprises a disk rotatably mounted within said valve body.

15. The valve according to claim 10, wherein each of said segments further comprises first and second keys positioned on opposite sides of said segments, each of said keys extending circumferentially around and projecting toward said central space.

16. The valve according to claim 15, wherein each of said keys comprises an arcuate surface engageable with a pipe element positioned within said central space.

17. The valve according to claim 10, further comprising:
a first support body positioned adjacent to said first connection member, said first support body having a surface facing said valve body and first and second posts in spaced apart relation extending away from said central space, said first post engaging a first segment of said plurality of segments, said second post engaging a second segment of said plurality of segments;
a second support body positioned adjacent to said second connection member, said second support body having a surface facing said valve body and first and second posts in spaced apart relation extending away from said central space, said first post of said second support body engaging said first segment, said second post of said second support body engaging said second segment; wherein said first and second support bodies cooperate with said liner to support said first and second segments in spaced apart relation in a pre-assembled configuration.

* * * * *